US008368339B2

(12) United States Patent
Jones et al.

(10) Patent No.: US 8,368,339 B2
(45) Date of Patent: Feb. 5, 2013

(54) ROBOT CONFINEMENT

(75) Inventors: Joseph L. Jones, Acton, MA (US);
Philip R. Mass, Denver, CO (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 12/540,564

(22) Filed: Aug. 13, 2009

(65) Prior Publication Data
US 2009/0319083 A1 Dec. 24, 2009

Related U.S. Application Data

(60) Continuation of application No. 11/929,558, filed on Oct. 30, 2007, now Pat. No. 7,579,803, which is a continuation of application No. 11/691,735, filed on Mar. 27, 2007, now abandoned, which is a continuation of application No. 11/221,392, filed on (Continued)

(51) Int. Cl.
*G05B 19/10* (2006.01)
(52) U.S. Cl. .................. 318/567; 318/568.12; 700/245; 700/246; 700/247; 901/1; 901/46; 901/47
(58) Field of Classification Search .............. 318/567, 318/568.12, 580, 583, 587; 700/245–247; 901/1, 46, 47
See application file for complete search history.

(56) References Cited

U.S. PATENT DOCUMENTS

| 1,755,054 | A | 4/1930 | Darst |
| 1,780,221 | A | 11/1930 | Buchmann |
| 1,970,302 | A | 8/1934 | Gerhardt |
| 2,136,324 | A | 11/1938 | John |
| 2,302,111 | A | 11/1942 | Dow et al. |
| 2,353,621 | A | 7/1944 | Sav et al. |
| 2,770,825 | A | 11/1956 | Pullen |
| 3,119,369 | A | 1/1964 | Harland et al. |
| 3,166,138 | A | 1/1965 | Dunn |
| 3,333,564 | A | 8/1967 | Waters |

(Continued)

FOREIGN PATENT DOCUMENTS

| AU | 2003275566 A1 | 6/2004 |
| AU | 2003275566 A1 | 6/2004 |

(Continued)

OTHER PUBLICATIONS

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

(Continued)

*Primary Examiner* — Walter Benson
*Assistant Examiner* — Erick Glass
(74) *Attorney, Agent, or Firm* — Fish & Richardson P.C.

(57) ABSTRACT

A method of confining a robot in a work space includes providing a portable barrier signal transmitting device including a primary emitter emitting a confinement beam primarily along an axis defining a directed barrier. A mobile robot including a detector, a drive motor and a control unit controlling the drive motor is caused to avoid the directed barrier upon detection by the detector on the robot. The detector on the robot has an omnidirectional field of view parallel to the plane of movement of the robot. The detector receives confinement light beams substantially in a plane at the height of the field of view while blocking or rejecting confinement light beams substantially above or substantially below the plane at the height of the field of view.

18 Claims, 9 Drawing Sheets

Related U.S. Application Data

Sep. 8, 2005, now Pat. No. 7,196,487, which is a continuation of application No. 10/921,775, filed on Aug. 19, 2004, now Pat. No. 6,965,209, which is a continuation of application No. 10/696,456, filed on Oct. 29, 2003, now Pat. No. 6,781,338, which is a division of application No. 10/056,804, filed on Jan. 24, 2002, now Pat. No. 6,690,134.

(60) Provisional application No. 60/263,692, filed on Jan. 24, 2001.

(56) References Cited

U.S. PATENT DOCUMENTS

| | | |
|---|---|---|
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | DeBrey |
| 3,678,882 A | 7/1972 | Kinsella |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli et al. |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,710,020 A | 12/1987 | Maddox et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George, II et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Waqkaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |

| | | | | | |
|---|---|---|---|---|---|
| 5,023,788 A | 6/1991 | Kitazume et al. | 5,386,862 A | 2/1995 | Glover et al. |
| 5,024,529 A | 6/1991 | Svetkoff et al. | 5,399,951 A | 3/1995 | Lavallee et al. |
| D318,500 S | 7/1991 | Malewicki et al. | 5,400,244 A | 3/1995 | Watanabe et al. |
| 5,032,775 A | 7/1991 | Mizuno et al. | 5,404,612 A | 4/1995 | Ishikawa |
| 5,033,151 A | 7/1991 | Kraft et al. | 5,410,479 A | 4/1995 | Coker |
| 5,033,291 A | 7/1991 | Podoloff et al. | 5,435,405 A | 7/1995 | Schempf et al. |
| 5,040,116 A | 8/1991 | Evans et al. | 5,440,216 A | 8/1995 | Kim |
| 5,045,769 A | 9/1991 | Everett | 5,442,358 A | 8/1995 | Keeler et al. |
| 5,049,802 A | 9/1991 | Mintus et al. | 5,444,965 A | 8/1995 | Colens |
| 5,051,906 A | 9/1991 | Evans et al. | 5,446,356 A | 8/1995 | Kim |
| 5,062,819 A | 11/1991 | Mallory | 5,446,445 A | 8/1995 | Bloomfield et al. |
| 5,070,567 A | 12/1991 | Holland | 5,451,135 A | 9/1995 | Schempf et al. |
| 5,084,934 A | 2/1992 | Lessig et al. | 5,454,129 A | 10/1995 | Kell |
| 5,086,535 A | 2/1992 | Grossmeyer et al. | 5,455,982 A | 10/1995 | Armstrong et al. |
| 5,090,321 A | 2/1992 | Abouav | 5,465,525 A | 11/1995 | Mifune et al. |
| 5,093,955 A | 3/1992 | Blehert et al. | 5,465,619 A | 11/1995 | Sotack et al. |
| 5,094,311 A | 3/1992 | Akeel | 5,467,273 A | 11/1995 | Faibish et al. |
| 5,105,502 A | 4/1992 | Takashima | 5,471,560 A | 11/1995 | Allard et al. |
| 5,105,550 A | 4/1992 | Shenoha | 5,491,670 A | 2/1996 | Weber |
| 5,109,566 A | 5/1992 | Kobayashi et al. | 5,497,529 A | 3/1996 | Boesi |
| 5,111,401 A | 5/1992 | Everett, Jr. et al. | 5,498,948 A | 3/1996 | Bruni et al. |
| 5,115,538 A | 5/1992 | Cochran et al. | 5,502,638 A | 3/1996 | Takenaka |
| 5,127,128 A | 7/1992 | Lee | 5,505,072 A | 4/1996 | Oreper |
| 5,136,675 A | 8/1992 | Hodson | 5,507,067 A | 4/1996 | Hoekstra et al. |
| 5,136,750 A | 8/1992 | Takashima et al. | 5,510,893 A | 4/1996 | Suzuki |
| 5,142,985 A | 9/1992 | Stearns et al. | 5,511,147 A | 4/1996 | Abdel-Malek |
| 5,144,471 A | 9/1992 | Takanashi et al. | 5,515,572 A | 5/1996 | Hoekstra et al. |
| 5,144,714 A | 9/1992 | Mori et al. | 5,534,762 A | 7/1996 | Kim |
| 5,144,715 A | 9/1992 | Matsuyo et al. | 5,537,017 A | 7/1996 | Feiten et al. |
| 5,152,028 A | 10/1992 | Hirano | 5,537,711 A | 7/1996 | Tseng |
| 5,152,202 A | 10/1992 | Strauss | 5,539,953 A | 7/1996 | Kurz |
| 5,154,617 A | 10/1992 | Suman et al. | 5,542,146 A | 8/1996 | Hoekstra et al. |
| 5,155,684 A | 10/1992 | Burke et al. | 5,542,148 A | 8/1996 | Young |
| 5,163,202 A | 11/1992 | Kawakami et al. | 5,546,631 A | 8/1996 | Chambon |
| 5,163,320 A | 11/1992 | Goshima et al. | 5,548,511 A | 8/1996 | Bancroft |
| 5,164,579 A | 11/1992 | Pryor et al. | 5,551,119 A | 9/1996 | Wörwag |
| 5,165,064 A | 11/1992 | Mattaboni | 5,551,525 A | 9/1996 | Pack et al. |
| 5,170,352 A | 12/1992 | McTamaney et al. | 5,553,349 A | 9/1996 | Kilstrom et al. |
| 5,173,881 A | 12/1992 | Sindle | 5,555,587 A | 9/1996 | Guha |
| 5,182,833 A | 2/1993 | Yamaguchi et al. | 5,560,077 A | 10/1996 | Crotchett |
| 5,187,662 A | 2/1993 | Kamimura et al. | 5,568,589 A | 10/1996 | Hwang |
| 5,202,742 A | 4/1993 | Frank et al. | D375,592 S | 11/1996 | Ljunggren |
| 5,204,814 A | 4/1993 | Noonan et al. | 5,608,306 A | 3/1997 | Rybeck et al. |
| 5,206,500 A | 4/1993 | Decker et al. | 5,608,894 A | 3/1997 | Kawakami et al. |
| 5,208,521 A | 5/1993 | Aoyama | 5,608,944 A | 3/1997 | Gordon |
| 5,216,777 A | 6/1993 | Moro et al. | 5,610,488 A | 3/1997 | Miyazawa |
| 5,227,985 A | 7/1993 | DeMenthon | 5,611,106 A | 3/1997 | Wulff |
| 5,233,682 A | 8/1993 | Abe et al. | 5,611,108 A | 3/1997 | Knowlton et al. |
| 5,239,720 A | 8/1993 | Wood et al. | 5,613,261 A | 3/1997 | Kawakami et al. |
| 5,251,358 A | 10/1993 | Moro et al. | 5,613,269 A | 3/1997 | Miwa |
| 5,261,139 A | 11/1993 | Lewis | 5,621,291 A | 4/1997 | Lee |
| 5,276,618 A | 1/1994 | Everett | 5,622,236 A | 4/1997 | Azumi et al. |
| 5,276,939 A | 1/1994 | Uenishi | 5,634,237 A | 6/1997 | Paranjpe |
| 5,277,064 A | 1/1994 | Knigga et al. | 5,634,239 A | 6/1997 | Tuvin et al. |
| 5,279,672 A | 1/1994 | Belker, Jr. et al. | 5,636,402 A | 6/1997 | Kubo et al. |
| 5,284,452 A | 2/1994 | Corona | 5,642,299 A | 6/1997 | Hardin et al. |
| 5,284,522 A | 2/1994 | Kobayashi et al. | 5,646,494 A | 7/1997 | Han |
| 5,293,955 A | 3/1994 | Lee | 5,647,554 A | 7/1997 | Ikegami et al. |
| D345,707 S | 4/1994 | Alister | 5,650,702 A | 7/1997 | Azumi |
| 5,303,448 A | 4/1994 | Hennessey et al. | 5,652,489 A | 7/1997 | Kawakami |
| 5,307,273 A | 4/1994 | Oh et al. | 5,682,313 A | 10/1997 | Edlund et al. |
| 5,309,592 A | 5/1994 | Hiratsuka | 5,682,839 A | 11/1997 | Grimsley et al. |
| 5,310,379 A | 5/1994 | Hippely et al. | 5,696,675 A | 12/1997 | Nakamura et al. |
| 5,315,227 A | 5/1994 | Pierson et al. | 5,698,861 A | 12/1997 | Oh |
| 5,319,827 A | 6/1994 | Yang | 5,709,007 A | 1/1998 | Chiang |
| 5,319,828 A | 6/1994 | Waldhauser et al. | 5,710,506 A | 1/1998 | Broell et al. |
| 5,321,614 A | 6/1994 | Ashworth | 5,714,119 A | 2/1998 | Kawagoe et al. |
| 5,323,483 A | 6/1994 | Baeg | 5,717,169 A | 2/1998 | Liang et al. |
| 5,324,948 A | 6/1994 | Dudar et al. | 5,717,484 A | 2/1998 | Hamaguchi et al. |
| 5,341,186 A | 8/1994 | Kato | 5,720,077 A | 2/1998 | Nakamura et al. |
| 5,341,540 A | 8/1994 | Soupert et al. | 5,732,401 A | 3/1998 | Conway |
| 5,341,549 A | 8/1994 | Wirtz et al. | 5,735,959 A | 4/1998 | Kubo et al. |
| 5,345,649 A | 9/1994 | Whitlow | 5,745,235 A | 4/1998 | Vercammen et al. |
| 5,352,901 A | 10/1994 | Poorman | 5,752,871 A | 5/1998 | Tsuzuki |
| 5,353,224 A | 10/1994 | Lee et al. | 5,756,904 A | 5/1998 | Oreper et al. |
| 5,363,305 A | 11/1994 | Cox et al. | 5,761,762 A | 6/1998 | Kubo et al. |
| 5,363,935 A | 11/1994 | Schempf et al. | 5,764,888 A | 6/1998 | Bolan et al. |
| 5,369,347 A | 11/1994 | Yoo | 5,767,437 A | 6/1998 | Rogers |
| 5,369,838 A | 12/1994 | Wood et al. | 5,767,960 A | 6/1998 | Orman |

| | | | | | | |
|---|---|---|---|---|---|---|
| 5,770,936 | A | 6/1998 | Hirai et al. | 6,055,042 | A | 4/2000 | Sarangapani |
| 5,777,596 | A | 7/1998 | Herbert | 6,055,702 | A | 5/2000 | Imamura et al. |
| 5,778,486 | A | 7/1998 | Kim | 6,061,868 | A | 5/2000 | Moritsch et al. |
| 5,781,697 | A | 7/1998 | Jeong | 6,065,182 | A | 5/2000 | Wright et al. |
| 5,781,960 | A | 7/1998 | Kilstrom et al. | 6,073,432 | A | 6/2000 | Schaedler |
| 5,786,602 | A | 7/1998 | Pryor et al. | 6,076,025 | A | 6/2000 | Ueno et al. |
| 5,787,545 | A | 8/1998 | Colens | 6,076,026 | A | 6/2000 | Jambhekar et al. |
| 5,793,900 | A | 8/1998 | Nourbakhsh et al. | 6,076,226 | A | 6/2000 | Reed |
| 5,794,297 | A | 8/1998 | Muta | 6,076,227 | A | 6/2000 | Schallig et al. |
| 5,812,267 | A | 9/1998 | Everett, Jr. et al. | 6,081,257 | A | 6/2000 | Zeller |
| 5,814,808 | A | 9/1998 | Takada et al. | 6,088,020 | A | 7/2000 | Mor |
| 5,815,880 | A | 10/1998 | Nakanishi | 6,094,775 | A | 8/2000 | Behmer |
| 5,815,884 | A | 10/1998 | Imamura et al. | 6,099,091 | A | 8/2000 | Campbell |
| 5,819,008 | A | 10/1998 | Asama et al. | 6,101,670 | A | 8/2000 | Song |
| 5,819,360 | A | 10/1998 | Fujii | 6,101,671 | A | 8/2000 | Wright et al. |
| 5,819,936 | A | 10/1998 | Saveliev et al. | 6,108,031 | A | 8/2000 | King et al. |
| 5,820,821 | A | 10/1998 | Kawagoe et al. | 6,108,067 | A | 8/2000 | Okamoto |
| 5,821,730 | A | 10/1998 | Drapkin | 6,108,076 | A | 8/2000 | Hanseder |
| 5,825,981 | A | 10/1998 | Matsuda | 6,108,269 | A | 8/2000 | Kabel |
| 5,828,770 | A | 10/1998 | Leis et al. | 6,108,597 | A | 8/2000 | Kirchner et al. |
| 5,831,597 | A | 11/1998 | West et al. | 6,112,143 | A | 8/2000 | Allen et al. |
| 5,839,156 | A | 11/1998 | Park et al. | 6,112,996 | A | 9/2000 | Matsuo |
| 5,839,532 | A | 11/1998 | Yoshiji et al. | 6,119,057 | A | 9/2000 | Kawagoe |
| 5,841,259 | A | 11/1998 | Kim et al. | 6,122,798 | A | 9/2000 | Kobayashi et al. |
| 5,867,800 | A | 2/1999 | Leif | 6,124,694 | A | 9/2000 | Bancroft et al. |
| 5,867,861 | A | 2/1999 | Kasen et al. | 6,125,498 | A | 10/2000 | Roberts et al. |
| 5,869,910 | A | 2/1999 | Colens | 6,131,237 | A | 10/2000 | Kasper et al. |
| 5,896,611 | A | 4/1999 | Haaga | 6,138,063 | A | 10/2000 | Himeda |
| 5,903,124 | A | 5/1999 | Kawakami | 6,142,252 | A | 11/2000 | Kinto et al. |
| 5,905,209 | A | 5/1999 | Oreper | 6,146,278 | A | 11/2000 | Kobayashi |
| 5,907,886 | A | 6/1999 | Buscher | 6,154,279 | A | 11/2000 | Thayer |
| 5,910,700 | A | 6/1999 | Crotzer | 6,154,694 | A | 11/2000 | Aoki et al. |
| 5,911,260 | A | 6/1999 | Suzuki | 6,160,479 | A | 12/2000 | Ahlen et al. |
| 5,916,008 | A | 6/1999 | Wong | 6,167,332 | A | 12/2000 | Kurtzberg et al. |
| 5,924,167 | A | 7/1999 | Wright et al. | 6,167,587 | B1 | 1/2001 | Kasper et al. |
| 5,926,909 | A | 7/1999 | McGee | 6,192,548 | B1 | 2/2001 | Huffman |
| 5,933,102 | A | 8/1999 | Miller et al. | 6,216,307 | B1 | 4/2001 | Kaleta et al. |
| 5,933,913 | A | 8/1999 | Wright et al. | 6,220,865 | B1 | 4/2001 | Macri et al. |
| 5,935,179 | A | 8/1999 | Kleiner et al. | 6,226,830 | B1 | 5/2001 | Hendricks et al. |
| 5,940,346 | A | 8/1999 | Sadowsky et al. | 6,230,362 | B1 | 5/2001 | Kasper et al. |
| 5,940,927 | A | 8/1999 | Haegermarck et al. | 6,237,741 | B1 | 5/2001 | Guidetti |
| 5,940,930 | A | 8/1999 | Oh et al. | 6,240,342 | B1 | 5/2001 | Fiegert et al. |
| 5,942,869 | A | 8/1999 | Katou et al. | 6,243,913 | B1 | 6/2001 | Frank et al. |
| 5,943,730 | A | 8/1999 | Boomgaarden | 6,255,793 | B1 | 7/2001 | Peless et al. |
| 5,943,733 | A | 8/1999 | Tagliaferri | 6,259,979 | B1 | 7/2001 | Holmquist |
| 5,947,225 | A | 9/1999 | Kawakami et al. | 6,261,379 | B1 | 7/2001 | Conrad et al. |
| 5,950,408 | A | 9/1999 | Schaedler | 6,263,539 | B1 | 7/2001 | Baig |
| 5,959,423 | A | 9/1999 | Nakanishi et al. | 6,263,989 | B1 | 7/2001 | Won |
| 5,968,281 | A | 10/1999 | Wright et al. | 6,272,936 | B1 | 8/2001 | Oreper et al. |
| 5,974,348 | A | 10/1999 | Rocks | 6,276,478 | B1 | 8/2001 | Hopkins et al. |
| 5,974,365 | A | 10/1999 | Mitchell | 6,278,918 | B1 | 8/2001 | Dickson et al. |
| 5,983,448 | A | 11/1999 | Wright et al. | 6,282,526 | B1 | 8/2001 | Ganesh |
| 5,984,880 | A | 11/1999 | Lander et al. | 6,283,034 | B1 | 9/2001 | Miles |
| 5,987,383 | A | 11/1999 | Keller et al. | 6,285,778 | B1 | 9/2001 | Nakajima et al. |
| 5,989,700 | A | 11/1999 | Krivopal | 6,285,930 | B1 | 9/2001 | Dickson et al. |
| 5,991,951 | A | 11/1999 | Kubo et al. | 6,300,737 | B1 | 10/2001 | Bergvall et al. |
| 5,995,883 | A | 11/1999 | Nishikado | 6,321,337 | B1 | 11/2001 | Reshef et al. |
| 5,995,884 | A | 11/1999 | Allen et al. | 6,321,515 | B1 | 11/2001 | Colens |
| 5,996,167 | A | 12/1999 | Close | 6,323,570 | B1 | 11/2001 | Nishimura et al. |
| 5,998,953 | A | 12/1999 | Nakamura et al. | 6,324,714 | B1 | 12/2001 | Walz et al. |
| 5,998,971 | A | 12/1999 | Corbridge | 6,327,741 | B1 | 12/2001 | Reed |
| 6,000,088 | A | 12/1999 | Wright et al. | 6,332,400 | B1 | 12/2001 | Meyer |
| 6,009,358 | A | 12/1999 | Angott et al. | 6,339,735 | B1 | 1/2002 | Peless et al. |
| 6,021,545 | A | 2/2000 | Delgado et al. | 6,362,875 | B1 | 3/2002 | Burkley |
| 6,023,813 | A | 2/2000 | Thatcher et al. | 6,370,453 | B2 | 4/2002 | Sommer |
| 6,023,814 | A | 2/2000 | Imamura | 6,374,155 | B1 | 4/2002 | Wallach et al. |
| 6,025,687 | A | 2/2000 | Himeda et al. | 6,374,157 | B1 | 4/2002 | Takamura |
| 6,026,539 | A | 2/2000 | Mouw et al. | 6,381,802 | B2 | 5/2002 | Park |
| 6,030,464 | A | 2/2000 | Azevedo | 6,385,515 | B1 | 5/2002 | Dickson et al. |
| 6,030,465 | A | 2/2000 | Marcussen et al. | 6,388,013 | B1 | 5/2002 | Saraf et al. |
| 6,032,542 | A | 3/2000 | Warnick et al. | 6,389,329 | B1 * | 5/2002 | Colens ......................... 700/262 |
| 6,036,572 | A | 3/2000 | Sze | 6,400,048 | B1 | 6/2002 | Nishimura et al. |
| 6,038,501 | A | 3/2000 | Kawakami | 6,401,294 | B2 | 6/2002 | Kasper |
| 6,040,669 | A | 3/2000 | Hog | 6,408,226 | B1 | 6/2002 | Byrne et al. |
| 6,041,471 | A | 3/2000 | Charkey et al. | 6,412,141 | B2 | 7/2002 | Kasper et al. |
| 6,041,472 | A | 3/2000 | Kasen et al. | 6,415,203 | B1 | 7/2002 | Inoue et al. |
| 6,046,800 | A | 4/2000 | Ohtomo et al. | 6,421,870 | B1 | 7/2002 | Basham et al. |
| 6,049,620 | A | 4/2000 | Dickinson et al. | 6,427,285 | B1 | 8/2002 | Legatt et al. |
| 6,052,821 | A | 4/2000 | Chouly et al. | 6,430,471 | B1 | 8/2002 | Kintou et al. |

| Patent | Kind | Date | Inventor |
|---|---|---|---|
| 6,431,296 | B1 | 8/2002 | Won |
| 6,437,227 | B1 | 8/2002 | Theimer |
| 6,437,465 | B1 | 8/2002 | Nishimura et al. |
| 6,438,456 | B1 | 8/2002 | Feddema et al. |
| 6,438,793 | B1 | 8/2002 | Miner et al. |
| 6,442,476 | B1 | 8/2002 | Poropat |
| 6,443,509 | B1 | 9/2002 | Levin et al. |
| 6,444,003 | B1 | 9/2002 | Sutcliffe |
| 6,446,302 | B1 | 9/2002 | Kasper et al. |
| 6,454,036 | B1 | 9/2002 | Airey et al. |
| D464,091 | S | 10/2002 | Christianson |
| 6,457,206 | B1 | 10/2002 | Judson |
| 6,459,955 | B1 | 10/2002 | Bartsch et al. |
| 6,463,368 | B1 | 10/2002 | Feiten et al. |
| 6,465,892 | B1 | 10/2002 | Suga |
| 6,465,982 | B1 | 10/2002 | Bergvall et al. |
| 6,473,167 | B1 | 10/2002 | Odell |
| 6,480,762 | B1 | 11/2002 | Uchikubo et al. |
| 6,481,515 | B1 | 11/2002 | Kirkpatrick et al. |
| 6,482,252 | B1 | 11/2002 | Conrad et al. |
| 6,490,539 | B1 | 12/2002 | Dickson et al. |
| 6,491,127 | B1 | 12/2002 | Holmberg et al. |
| 6,493,612 | B1 | 12/2002 | Bisset et al. |
| 6,493,613 | B2 | 12/2002 | Peless et al. |
| 6,496,754 | B2 | 12/2002 | Song et al. |
| 6,496,755 | B2 | 12/2002 | Wallach et al. |
| 6,502,657 | B2 | 1/2003 | Kerrebrock et al. |
| 6,504,610 | B1 | 1/2003 | Bauer et al. |
| 6,507,773 | B2 | 1/2003 | Parker et al. |
| 6,525,509 | B1 | 2/2003 | Petersson et al. |
| D471,243 | S | 3/2003 | Cioffi et al. |
| 6,532,404 | B2 | 3/2003 | Colens |
| 6,535,793 | B2 | 3/2003 | Allard |
| 6,540,607 | B2 | 4/2003 | Mokris et al. |
| 6,548,982 | B1 | 4/2003 | Papanikolopoulos et al. |
| 6,553,612 | B1 | 4/2003 | Dyson et al. |
| 6,556,722 | B1 | 4/2003 | Russell et al. |
| 6,556,892 | B2 | 4/2003 | Kuroki et al. |
| 6,557,104 | B2 | 4/2003 | Vu et al. |
| D474,312 | S | 5/2003 | Stephens et al. |
| 6,563,130 | B2 | 5/2003 | Dworkowski et al. |
| 6,571,415 | B2 | 6/2003 | Gerber et al. |
| 6,571,422 | B1 | 6/2003 | Gordon et al. |
| 6,572,711 | B2 | 6/2003 | Sclafani et al. |
| 6,574,536 | B1 | 6/2003 | Kawagoe et al. |
| 6,580,246 | B2 | 6/2003 | Jacobs |
| 6,584,376 | B1 | 6/2003 | Van Kommer |
| 6,586,908 | B2 | 7/2003 | Petersson et al. |
| 6,587,573 | B1 | 7/2003 | Stam et al. |
| 6,590,222 | B1 | 7/2003 | Bisset et al. |
| 6,594,551 | B2 | 7/2003 | McKinney et al. |
| 6,594,844 | B2 | 7/2003 | Jones |
| 6,597,076 | B2 | 7/2003 | Scheible et al. |
| D478,884 | S | 8/2003 | Slipy et al. |
| 6,601,265 | B1 | 8/2003 | Burlington |
| 6,604,021 | B2 | 8/2003 | Imai et al. |
| 6,604,022 | B2 | 8/2003 | Parker et al. |
| 6,605,156 | B1 | 8/2003 | Clark et al. |
| 6,611,120 | B2 | 8/2003 | Song et al. |
| 6,611,734 | B2 | 8/2003 | Parker et al. |
| 6,611,738 | B2 | 8/2003 | Ruffner |
| 6,615,108 | B1 | 9/2003 | Peless et al. |
| 6,615,885 | B1 | 9/2003 | Ohm |
| 6,622,465 | B2 | 9/2003 | Jerome et al. |
| 6,624,744 | B1 | 9/2003 | Wilson et al. |
| 6,625,843 | B2 | 9/2003 | Kim et al. |
| 6,629,028 | B2 | 9/2003 | Paromtchik et al. |
| 6,639,659 | B2 | 10/2003 | Granger |
| 6,658,325 | B2 | 12/2003 | Zweig |
| 6,658,354 | B2 | 12/2003 | Lin |
| 6,658,692 | B2 | 12/2003 | Lenkiewicz et al. |
| 6,658,693 | B1 | 12/2003 | Reed, Jr. |
| 6,661,239 | B1 | 12/2003 | Ozick |
| 6,662,889 | B2 | 12/2003 | De Fazio et al. |
| 6,668,951 | B2 | 12/2003 | Won |
| 6,670,817 | B2 | 12/2003 | Fournier et al. |
| 6,671,592 | B1 | 12/2003 | Bisset et al. |
| 6,677,938 | B1 | 1/2004 | Maynard |
| 6,687,571 | B1 | 2/2004 | Byrne et al. |
| 6,690,134 | B1 | 2/2004 | Jones et al. |
| 6,690,993 | B2 | 2/2004 | Foulke et al. |
| 6,697,147 | B2 | 2/2004 | Ko et al. |
| 6,711,280 | B2 | 3/2004 | Stafsudd et al. |
| 6,732,826 | B2 | 5/2004 | Song et al. |
| 6,737,591 | B1 | 5/2004 | Lapstun et al. |
| 6,741,054 | B2 | 5/2004 | Koselka et al. |
| 6,741,364 | B2 | 5/2004 | Lange et al. |
| 6,748,297 | B2 | 6/2004 | Song et al. |
| 6,756,703 | B2 | 6/2004 | Chang |
| 6,760,647 | B2 | 7/2004 | Nourbakhsh et al. |
| 6,764,373 | B1 | 7/2004 | Osawa et al. |
| 6,769,004 | B2 | 7/2004 | Barrett |
| 6,774,596 | B1 | 8/2004 | Bisset |
| 6,779,380 | B1 | 8/2004 | Nieuwkamp |
| 6,781,338 | B2 | 8/2004 | Jones et al. |
| 6,809,490 | B2 | 10/2004 | Jones et al. |
| 6,810,305 | B2 | 10/2004 | Kirkpatrick |
| 6,830,120 | B1 | 12/2004 | Yashima et al. |
| 6,832,407 | B2 | 12/2004 | Salem et al. |
| 6,836,701 | B2 | 12/2004 | McKee |
| 6,841,963 | B2 | 1/2005 | Song et al. |
| 6,845,297 | B2 | 1/2005 | Allard |
| 6,856,811 | B2 | 2/2005 | Burdue et al. |
| 6,859,010 | B2 | 2/2005 | Jeon et al. |
| 6,859,682 | B2 | 2/2005 | Naka et al. |
| 6,860,206 | B1 | 3/2005 | Rudakevych et al. |
| 6,865,447 | B2 | 3/2005 | Lau et al. |
| 6,870,792 | B2 | 3/2005 | Chiappetta |
| 6,871,115 | B2 | 3/2005 | Huang et al. |
| 6,883,201 | B2 | 4/2005 | Jones et al. |
| 6,886,651 | B1 | 5/2005 | Slocum et al. |
| 6,888,333 | B2 | 5/2005 | Laby |
| 6,901,624 | B2 | 6/2005 | Mori et al. |
| 6,906,702 | B1 | 6/2005 | Tanaka et al. |
| 6,914,403 | B2 | 7/2005 | Tsurumi |
| 6,917,854 | B2 | 7/2005 | Bayer |
| 6,925,357 | B2 | 8/2005 | Wang et al. |
| 6,925,679 | B2 | 8/2005 | Wallach et al. |
| 6,929,548 | B2 | 8/2005 | Wang |
| D510,066 | S | 9/2005 | Hickey et al. |
| 6,938,298 | B2 | 9/2005 | Aasen |
| 6,940,291 | B1 | 9/2005 | Ozick |
| 6,941,199 | B1 | 9/2005 | Bottomley et al. |
| 6,956,348 | B2 | 10/2005 | Landry et al. |
| 6,957,712 | B2 | 10/2005 | Song et al. |
| 6,960,986 | B2 | 11/2005 | Asama et al. |
| 6,965,209 | B2 | 11/2005 | Jones et al. |
| 6,965,211 | B2 | 11/2005 | Tsurumi |
| 6,968,592 | B2 | 11/2005 | Takeuchi et al. |
| 6,971,140 | B2 | 12/2005 | Kim |
| 6,975,246 | B1 | 12/2005 | Trudeau |
| 6,980,229 | B1 | 12/2005 | Ebersole |
| 6,985,556 | B2 | 1/2006 | Shanmugavel et al. |
| 6,993,954 | B1 | 2/2006 | George et al. |
| 6,999,850 | B2 | 2/2006 | McDonald |
| 7,013,527 | B2 | 3/2006 | Thomas et al. |
| 7,024,278 | B2 | 4/2006 | Chiappetta et al. |
| 7,024,280 | B2 | 4/2006 | Parker et al. |
| 7,027,893 | B2 | 4/2006 | Perry et al. |
| 7,030,768 | B2 | 4/2006 | Wanie |
| 7,031,805 | B2 | 4/2006 | Lee et al. |
| 7,032,469 | B2 | 4/2006 | Bailey |
| 7,041,029 | B2 | 5/2006 | Fulghum et al. |
| 7,053,578 | B2 | 5/2006 | Diehl et al. |
| 7,054,716 | B2 | 5/2006 | McKee et al. |
| 7,055,210 | B2 | 6/2006 | Keppler et al. |
| 7,057,120 | B2 | 6/2006 | Ma et al. |
| 7,057,643 | B2 | 6/2006 | Iida et al. |
| 7,065,430 | B2 | 6/2006 | Naka et al. |
| 7,066,291 | B2 | 6/2006 | Martins et al. |
| 7,069,124 | B1 | 6/2006 | Whittaker et al. |
| 7,079,923 | B2 | 7/2006 | Abramson et al. |
| 7,085,623 | B2 | 8/2006 | Siegers |
| 7,085,624 | B2 | 8/2006 | Aldred et al. |
| 7,113,847 | B2 | 9/2006 | Chmura et al. |
| 7,133,746 | B2 | 11/2006 | Abramson et al. |
| 7,142,198 | B2 | 11/2006 | Lee |
| 7,148,458 | B2 | 12/2006 | Schell et al. |

| Patent/Publication | Date | Inventor(s) |
|---|---|---|
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Huldén |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan et al. |
| 7,320,149 B1 | 1/2008 | Huffman et al. |
| 7,324,870 B2 | 1/2008 | Lee |
| 7,328,196 B2 | 2/2008 | Peters |
| 7,332,890 B2 | 2/2008 | Cohen et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,765,635 B2 | 8/2010 | Park |
| 7,801,645 B2 | 9/2010 | Taylor et al. |
| 7,805,220 B2 | 9/2010 | Taylor et al. |
| 7,809,944 B2 | 10/2010 | Kawamoto |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |

| | | |
|---|---|---|
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0067994 A1 | 3/2005 | Jones et al. |
| 2005/0085947 A1 | 4/2005 | Aldred et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | de Guzman |
| 2006/0000050 A1 | 1/2006 | Cipolla et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Ermakov |
| 2007/0114975 A1 | 5/2007 | Cohen et al. |
| 2007/0150096 A1 | 6/2007 | Yeh et al. |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0184518 A1 | 8/2008 | Taylor |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 2128842 C3 | 12/1980 |
| DE | 3317376 A1 | 11/1984 |
| DE | 3536907 C2 | 2/1989 |
| DE | 3404202 C2 | 12/1992 |
| DE | 199311014 U1 | 10/1993 |
| DE | 4414683 A1 | 10/1995 |
| DE | 4338841 C2 | 8/1999 |
| DE | 19849978 | 2/2001 |
| DE | 19849978 C2 | 2/2001 |
| DE | 10242257 A1 | 4/2003 |
| DE | 10242257 A1 | 4/2003 |
| DE | 102004038074.0 | 6/2005 |
| DE | 10357636 A1 | 7/2005 |
| DE | 10357636 A1 | 7/2005 |
| DE | 102004041021 B3 | 8/2005 |
| DE | 102004041021 B3 | 8/2005 |

| | | | | | | |
|---|---|---|---|---|---|---|
| DE | 102005046813 A1 | 4/2007 | | JP | 62-154008 | 7/1987 |
| DE | 102005046813 A1 | 4/2007 | | JP | 62164431 U | 10/1987 |
| DK | 198803389 A | 12/1988 | | JP | 62263507 A | 11/1987 |
| EP | 0114926 | 8/1984 | | JP | 62263508 A | 11/1987 |
| EP | 265542 A1 | 5/1988 | | JP | 62189057 U | 12/1987 |
| EP | 281085 A2 | 9/1988 | | JP | 63079623 A | 4/1988 |
| EP | 307381 A3 | 7/1990 | | JP | 63-183032 | 7/1988 |
| EP | 358628 A3 | 5/1991 | | JP | 63158032 A | 7/1988 |
| EP | 437024 A1 | 7/1991 | | JP | 63-241610 | 10/1988 |
| EP | 433697 A3 | 12/1992 | | JP | 1162454 A | 6/1989 |
| EP | 479273 A3 | 5/1993 | | JP | 1118752 | 8/1989 |
| EP | 294101 B1 | 12/1993 | | JP | 2-6312 | 1/1990 |
| EP | 554978 A3 | 3/1994 | | JP | 2006312 U1 | 1/1990 |
| EP | 615719 A1 | 9/1994 | | JP | 2026312 B | 6/1990 |
| EP | 0748006 | 12/1996 | | JP | 2283343 A | 11/1990 |
| EP | 0 792 726 | 9/1997 | | JP | 03-051023 | 3/1991 |
| EP | 861629 A1 | 9/1998 | | JP | 3051023 A2 | 3/1991 |
| EP | 930040 A3 | 10/1999 | | JP | 3197758 A | 8/1991 |
| EP | 845237 B1 | 4/2000 | | JP | 3201903 A | 9/1991 |
| EP | 1018315 A1 | 7/2000 | | JP | 4019586 B | 3/1992 |
| EP | 1172719 A1 | 1/2002 | | JP | 4084921 A | 3/1992 |
| EP | 1228734 A3 | 6/2003 | | JP | 04300516 | 10/1992 |
| EP | 1 331 537 A1 | 7/2003 | | JP | 5023269 B | 4/1993 |
| EP | 1380245 | 1/2004 | | JP | 5091604 A2 | 4/1993 |
| EP | 1380246 A2 | 1/2004 | | JP | 05095879 | 4/1993 |
| EP | 1380246 A3 | 3/2005 | | JP | 5042076 U | 6/1993 |
| EP | 1553472 | 7/2005 | | JP | 5046246 U | 6/1993 |
| EP | 1553472 A1 | 7/2005 | | JP | 5150827 A | 6/1993 |
| EP | 1557730 | 7/2005 | | JP | 5150829 A | 6/1993 |
| EP | 1557730 A1 | 7/2005 | | JP | 5046239 B | 7/1993 |
| EP | 1642522 A2 | 4/2006 | | JP | 5054620JU | 7/1993 |
| EP | 1806086 | 7/2007 | | JP | 5054620 U | 7/1993 |
| EP | 1836941 | 9/2007 | | JP | 05175933 | 7/1993 |
| EP | 1642522 A3 | 11/2007 | | JP | 5040519 Y2 | 10/1993 |
| ES | 2238196 B1 | 11/2006 | | JP | 5257527 A | 10/1993 |
| FR | 2601443 B1 | 11/1991 | | JP | 5257533 A | 10/1993 |
| FR | 2 828 589 | 8/2001 | | JP | 5285861 A | 11/1993 |
| GB | 381622 | 10/1932 | | JP | 5302836 | 11/1993 |
| GB | 449815 | 7/1936 | | JP | 5312514 | 11/1993 |
| GB | 702426 A | 1/1954 | | JP | 5341904 | 12/1993 |
| GB | 2128842 B | 4/1986 | | JP | 6003251 Y2 | 1/1994 |
| GB | 2213047 A | 8/1989 | | JP | 6026312 U | 4/1994 |
| GB | 2225221 A | 5/1990 | | JP | 6137828 A | 5/1994 |
| GB | 2225221 A | 5/1990 | | JP | 6154143 | 6/1994 |
| GB | 2 283 838 | 5/1995 | | JP | 6293095 A | 10/1994 |
| GB | 2284957 A | 6/1995 | | JP | 06-327598 | 11/1994 |
| GB | 2267360 B | 12/1995 | | JP | 6105781 B | 12/1994 |
| GB | 2300082 B | 9/1999 | | JP | 7047046 | 2/1995 |
| GB | 2404330 B | 7/2005 | | JP | 7059702 A2 | 3/1995 |
| GB | 2417354 A | 2/2006 | | JP | 07-129239 | 5/1995 |
| JP | 53021869 U | 2/1978 | | JP | 7059702 B | 6/1995 |
| JP | 53110257 A | 9/1978 | | JP | 7222705 A | 8/1995 |
| JP | 53110257 A2 | 9/1978 | | JP | 7222705 A2 | 8/1995 |
| JP | 943901 C | 3/1979 | | JP | 7270518 A | 10/1995 |
| JP | 57014726 A2 | 1/1982 | | JP | 7281742 A2 | 10/1995 |
| JP | 57064217 A | 4/1982 | | JP | 7281752 A | 10/1995 |
| JP | 59005315 B | 2/1984 | | JP | 7-295636 | 11/1995 |
| JP | 59033511 U | 3/1984 | | JP | 7311041 A2 | 11/1995 |
| JP | 59094005 A | 5/1984 | | JP | 7313417 A | 12/1995 |
| JP | 59099308 U | 7/1984 | | JP | 7313417 A | 12/1995 |
| JP | 59112311 U | 7/1984 | | JP | 7319542 A2 | 12/1995 |
| JP | 59033511 B | 8/1984 | | JP | 8-16776 | 1/1996 |
| JP | 59120124 U | 8/1984 | | JP | 8000393 B2 | 1/1996 |
| JP | 59131668 U | 9/1984 | | JP | 8000393 Y2 | 1/1996 |
| JP | 59164973 A | 9/1984 | | JP | 8016241 A2 | 1/1996 |
| JP | 59184917 A | 10/1984 | | JP | 8016776 B2 | 2/1996 |
| JP | 2283343 A2 | 11/1984 | | JP | 8063229 | 3/1996 |
| JP | 59212924 A | 12/1984 | | JP | 8083125 A | 3/1996 |
| JP | 59226909 A | 12/1984 | | JP | 8083125 A2 | 3/1996 |
| JP | 60089213 | 5/1985 | | JP | 08-089451 | 4/1996 |
| JP | 60089213 U | 6/1985 | | JP | 8084696 | 4/1996 |
| JP | 60211510 A | 10/1985 | | JP | 8089449 A | 4/1996 |
| JP | 60259895 A | 12/1985 | | JP | 2520732 B2 | 5/1996 |
| JP | 61023221 A2 | 1/1986 | | JP | 8123548 A | 5/1996 |
| JP | 61097712 A | 5/1986 | | JP | 8123548 A | 5/1996 |
| JP | 61023221 B | 6/1986 | | JP | 08-152916 | 6/1996 |
| JP | 62074018 A | 4/1987 | | JP | 8152916 A2 | 6/1996 |
| JP | 62070709 U | 5/1987 | | JP | 8256960 A2 | 10/1996 |
| JP | 62-120510 | 6/1987 | | JP | 8263137 A | 10/1996 |

| | | | | | | |
|---|---|---|---|---|---|---|
| JP | 8263137 | A | 10/1996 | JP | 11282532 A | 10/1999 |
| JP | 8286741 | A2 | 11/1996 | JP | 11282533 A | 10/1999 |
| JP | 8286744 | A2 | 11/1996 | JP | 11295412 A | 10/1999 |
| JP | 8322774 | A | 12/1996 | JP | 11295412 A | 10/1999 |
| JP | 8322774 | A2 | 12/1996 | JP | 11346964 | 12/1999 |
| JP | 8335112 | A | 12/1996 | JP | 11346964 A2 | 12/1999 |
| JP | 8335112 | A | 12/1996 | JP | 2000047728 | 2/2000 |
| JP | 9043901 | A | 2/1997 | JP | 2000056006 | 2/2000 |
| JP | 9044240 | A | 2/1997 | JP | 2000056006 A | 2/2000 |
| JP | 9047413 | A | 2/1997 | JP | 2000056831 | 2/2000 |
| JP | 9066855 | A | 3/1997 | JP | 2000056831 A | 2/2000 |
| JP | 9066855 | A | 3/1997 | JP | 2000060782 | 2/2000 |
| JP | 9145309 | A | 6/1997 | JP | 2000066722 | 3/2000 |
| JP | 9160644 | A | 6/1997 | JP | 2000066722 A | 3/2000 |
| JP | 9160644 | A2 | 6/1997 | JP | 2000075925 | 3/2000 |
| JP | 9-179625 | | 7/1997 | JP | 2000075925 A | 3/2000 |
| JP | 9179625 | A2 | 7/1997 | JP | 2000102499 | 4/2000 |
| JP | 9179685 | A2 | 7/1997 | JP | 10240343 A2 | 5/2000 |
| JP | 9185410 | | 7/1997 | JP | 2000510750 | 8/2000 |
| JP | 9192069 | A2 | 7/1997 | JP | 200279353 | 10/2000 |
| JP | 9204223 | A2 | 8/1997 | JP | 2000275321 A | 10/2000 |
| JP | 9206258 | A | 8/1997 | JP | 2000342497 | 12/2000 |
| JP | 9206258 | A2 | 8/1997 | JP | 2000342498 | 12/2000 |
| JP | 9233712 | A | 9/1997 | JP | 2000353014 A | 12/2000 |
| JP | 09251318 | | 9/1997 | JP | 2000353014 A2 | 12/2000 |
| JP | 9251318 | A | 9/1997 | JP | 200122443 | 1/2001 |
| JP | 9265319 | A | 10/1997 | JP | 2001022443 A | 1/2001 |
| JP | 9265319 | A | 10/1997 | JP | 2001067588 A | 3/2001 |
| JP | 9269807 | A | 10/1997 | JP | 2001087182 | 4/2001 |
| JP | 9269807 | A | 10/1997 | JP | 2001087182 A | 4/2001 |
| JP | 9269810 | A | 10/1997 | JP | 2001121455 | 5/2001 |
| JP | 9269810 | A | 10/1997 | JP | 2001125641 A | 5/2001 |
| JP | 02555263 | Y2 | 11/1997 | JP | 2001508572 | 6/2001 |
| JP | 9319431 | A | 12/1997 | JP | 2001197008 | 7/2001 |
| JP | 9319431 | A2 | 12/1997 | JP | 2001216482 A | 8/2001 |
| JP | 9319432 | A | 12/1997 | JP | 2001-258807 | 9/2001 |
| JP | 9319432 | A | 12/1997 | JP | 2001265437 | 9/2001 |
| JP | 9319434 | A | 12/1997 | JP | 2001265437 A | 9/2001 |
| JP | 9319434 | A | 12/1997 | JP | 2001-275908 | 10/2001 |
| JP | 9325812 | A | 12/1997 | JP | 2001289939 A | 10/2001 |
| JP | 9325812 | A | 12/1997 | JP | 2001306170 A | 11/2001 |
| JP | 10055215 | A | 2/1998 | JP | 2001320781 A | 11/2001 |
| JP | 10055215 | A | 2/1998 | JP | 2001-525567 | 12/2001 |
| JP | 10117973 | A | 5/1998 | JP | 2002-78650 | 3/2002 |
| JP | 10117973 | A | 5/1998 | JP | 2002073170 | 3/2002 |
| JP | 10117973 | A2 | 5/1998 | JP | 2002-204768 | 7/2002 |
| JP | 10118963 | A | 5/1998 | JP | 2002204769 A | 7/2002 |
| JP | 10118963 | A | 5/1998 | JP | 2002247510 A | 8/2002 |
| JP | 10165738 | | 6/1998 | JP | 3356170 | 10/2002 |
| JP | 10177414 | A | 6/1998 | JP | 2002532178 A | 10/2002 |
| JP | 10214114 | A | 8/1998 | JP | 2002532180 | 10/2002 |
| JP | 10214114 | A2 | 8/1998 | JP | 2002-323925 | 11/2002 |
| JP | 10228316 | | 8/1998 | JP | 3375843 | 11/2002 |
| JP | 10240342 | A2 | 9/1998 | JP | 2002333920 | 11/2002 |
| JP | 10260727 | A2 | 9/1998 | JP | 2002333920 A | 11/2002 |
| JP | 10295595 | A | 11/1998 | JP | 2002-355206 | 12/2002 |
| JP | 10295595 | A | 11/1998 | JP | 2002-360471 | 12/2002 |
| JP | 10314088 | | 12/1998 | JP | 2002-360482 | 12/2002 |
| JP | 11015941 | A | 1/1999 | JP | 2002360479 A | 12/2002 |
| JP | 11015941 | A | 1/1999 | JP | 2002366227 A | 12/2002 |
| JP | 11065655 | A2 | 3/1999 | JP | 2002369778 A | 12/2002 |
| JP | 11085269 | A2 | 3/1999 | JP | 2002369778 A2 | 12/2002 |
| JP | 11102219 | A2 | 4/1999 | JP | 2003-10076 | 1/2003 |
| JP | 11102220 | A | 4/1999 | JP | 2003010076 A | 1/2003 |
| JP | 11102220 | A | 4/1999 | JP | 2003010076 A | 1/2003 |
| JP | 11162454 | A | 6/1999 | JP | 2003010088 | 1/2003 |
| JP | 11174145 | A | 7/1999 | JP | 2003010088 A | 1/2003 |
| JP | 11174145 | A | 7/1999 | JP | 2003015740 | 1/2003 |
| JP | 11175149 | A | 7/1999 | JP | 2003015740 A | 1/2003 |
| JP | 11175149 | A | 7/1999 | JP | 2003028528 A | 1/2003 |
| JP | 11178764 | A | 7/1999 | JP | 2003-5296 | 2/2003 |
| JP | 11178765 | A | 7/1999 | JP | 2003-036116 | 2/2003 |
| JP | 11-508810 | | 8/1999 | JP | 2003-38401 | 2/2003 |
| JP | 11212642 | A | 8/1999 | JP | 2003-38402 | 2/2003 |
| JP | 11212642 | A2 | 8/1999 | JP | 2003-505127 | 2/2003 |
| JP | 11213157 | A | 8/1999 | JP | 2003047579 A | 2/2003 |
| JP | 11213157 | A | 8/1999 | JP | 2003052596 A | 2/2003 |
| JP | 11-510935 | | 9/1999 | JP | 2003-061882 | 3/2003 |
| JP | 11248806 | A | 9/1999 | JP | 2003061882 | 3/2003 |

| | | | | | | |
|---|---|---|---|---|---|---|
| JP | 2003084994 A | 3/2003 | | WO | WO 97/15224 | 5/1997 |
| JP | 2003167628 | 6/2003 | | WO | WO 97/40734 | 11/1997 |
| JP | 2003167628 A | 6/2003 | | WO | WO 97/41451 | 11/1997 |
| JP | 2003180586 | 7/2003 | | WO | WO 98/53456 | 11/1998 |
| JP | 2003180586 A | 7/2003 | | WO | 9908584 | 2/1999 |
| JP | 2003180587 A | 7/2003 | | WO | WO9905580 A2 | 2/1999 |
| JP | 2003186539 A | 7/2003 | | WO | WO 99/16078 | 4/1999 |
| JP | 2003190064 A | 7/2003 | | WO | WO 99/28800 | 6/1999 |
| JP | 2003190064 A2 | 7/2003 | | WO | WO 99/38056 | 6/1999 |
| JP | 2003228421 | 8/2003 | | WO | WO 99/38237 | 7/1999 |
| JP | 2003241836 A | 8/2003 | | WO | WO 99/43250 | 9/1999 |
| JP | 2003262520 | 9/2003 | | WO | WO 99/59042 | 11/1999 |
| JP | 2003262520 A | 9/2003 | | WO | WO 00/04430 | 1/2000 |
| JP | 2003285288 A | 10/2003 | | WO | WO 00/36962 | 6/2000 |
| JP | 2003304992 | 10/2003 | | WO | WO 00/38026 | 6/2000 |
| JP | 2003304992 A | 10/2003 | | WO | WO0038028 A1 | 6/2000 |
| JP | 2003-310489 | 11/2003 | | WO | WO0038028 A1 | 6/2000 |
| JP | 2003310509 | 11/2003 | | WO | WO0038029 A1 | 6/2000 |
| JP | 2003310509 A | 11/2003 | | WO | WO 00/78410 | 12/2000 |
| JP | 2003330543 A | 11/2003 | | WO | WO 01/06904 | 2/2001 |
| JP | 2004123040 | 4/2004 | | WO | WO 01/06905 | 2/2001 |
| JP | 2004123040 A | 4/2004 | | WO | WO0180703 A1 | 11/2001 |
| JP | 2004125479 | 4/2004 | | WO | WO0191623 A2 | 12/2001 |
| JP | 2004148021 | 5/2004 | | WO | WO 02/39864 | 5/2002 |
| JP | 2004148021 A | 5/2004 | | WO | WO 02/39868 | 5/2002 |
| JP | 2004160102 | 6/2004 | | WO | WO 02/058527 | 8/2002 |
| JP | 2004160102 A | 6/2004 | | WO | WO 02/062194 | 8/2002 |
| JP | 2004166968 A | 6/2004 | | WO | WO 02/067744 | 9/2002 |
| JP | 2004174228 | 6/2004 | | WO | WO 02/067745 | 9/2002 |
| JP | 2004174228 A | 6/2004 | | WO | WO 02/071175 | 9/2002 |
| JP | 2004198330 A | 7/2004 | | WO | WO 02/074150 | 9/2002 |
| JP | 2004219185 A | 8/2004 | | WO | WO 02/075356 | 9/2002 |
| JP | 2004267236 | 9/2004 | | WO | WO 02/075469 | 9/2002 |
| JP | 2004304714 | 10/2004 | | WO | WO 02/075470 | 9/2002 |
| JP | 2004306242 | 11/2004 | | WO | WO02067752 A1 | 9/2002 |
| JP | 2005040578 | 2/2005 | | WO | WO02069774 A1 | 9/2002 |
| JP | 2005352707 | 2/2005 | | WO | WO02069775 A2 | 9/2002 |
| JP | 2005117295 | 4/2005 | | WO | WO02075350 A1 | 9/2002 |
| JP | 2005118354 A | 5/2005 | | WO | WO02081074 A1 | 10/2002 |
| JP | 2005135400 | 5/2005 | | WO | WO 02/101477 | 12/2002 |
| JP | 2005135400 A | 5/2005 | | WO | WO03015220 A1 | 2/2003 |
| JP | 2005142800 | 6/2005 | | WO | WO03024292 A2 | 3/2003 |
| JP | 2005211360 A | 8/2005 | | WO | WO 03/026474 | 4/2003 |
| JP | 2005224265 A | 8/2005 | | WO | WO 03/040845 | 5/2003 |
| JP | 2005230032 A | 9/2005 | | WO | WO 03/040846 | 5/2003 |
| JP | 2005245916 | 9/2005 | | WO | WO0269775 A3 | 5/2003 |
| JP | 2005245916 A | 9/2005 | | WO | WO03040546 A1 | 5/2003 |
| JP | 2005528967 | 9/2005 | | WO | WO03062850 A2 | 7/2003 |
| JP | 2005296511 A | 10/2005 | | WO | WO03062852 A1 | 7/2003 |
| JP | 2005346700 A2 | 12/2005 | | WO | WO 2004/004533 A1 | 1/2004 |
| JP | 2005352707 A | 12/2005 | | WO | WO 2004/006034 | 1/2004 |
| JP | 2006043071 | 2/2006 | | WO | WO 2004/058028 A2 | 1/2004 |
| JP | 2006043071 A | 2/2006 | | WO | WO 2005/077244 A1 | 1/2004 |
| JP | 2006155274 | 6/2006 | | WO | WO 2006/068403 A1 | 1/2004 |
| JP | 2006155274 A | 6/2006 | | WO | WO2004004534 A1 | 1/2004 |
| JP | 2006164223 A | 6/2006 | | WO | WO2004005956 A1 | 1/2004 |
| JP | 2006227673 A | 8/2006 | | WO | WO2004025947 A3 | 5/2004 |
| JP | 2006247467 | 9/2006 | | WO | WO2004043215 A1 | 5/2004 |
| JP | 2006247467 A | 9/2006 | | WO | WO2004043215 A1 | 5/2004 |
| JP | 2006260161 | 9/2006 | | WO | WO2004/058028 | 7/2004 |
| JP | 2006260161 A | 9/2006 | | WO | WO2004/059409 | 7/2004 |
| JP | 2006293662 | 10/2006 | | WO | WO2004058028 | 7/2004 |
| JP | 2006293662 A | 10/2006 | | WO | WO2005006935 A1 | 1/2005 |
| JP | 2006296697 | 11/2006 | | WO | WO2005006935 A1 | 1/2005 |
| JP | 2006296697 A | 11/2006 | | WO | 2005037496 | 4/2005 |
| JP | 2007034866 | 2/2007 | | WO | WO2005036292 A1 | 4/2005 |
| JP | 2007034866 A | 2/2007 | | WO | WO2005036292 A1 | 4/2005 |
| JP | 2007213180 | 8/2007 | | WO | WO 2005/055795 | 6/2005 |
| JP | 2007213180 A | 8/2007 | | WO | WO2005055796 | 6/2005 |
| JP | 04074285 B2 | 4/2008 | | WO | WO2005055796 A2 | 6/2005 |
| JP | 2009015611 | 1/2009 | | WO | 2005062271 | 7/2005 |
| JP | 2009015611 A | 1/2009 | | WO | WO2005076545 A1 | 8/2005 |
| JP | 2010198552 | 9/2010 | | WO | WO2005077243 A1 | 8/2005 |
| JP | 2010198552 A | 9/2010 | | WO | WO2005081074 A1 | 9/2005 |
| KR | 1020043088 | 1/2004 | | WO | WO2005082223 A1 | 9/2005 |
| US | RE28268 E1 | 12/1974 | | WO | WO2005082223 A1 | 9/2005 |
| WO | WO 95/26512 | 10/1995 | | WO | WO2005083541 A1 | 9/2005 |
| WO | WO9530887 A1 | 11/1995 | | WO | WO2005098475 A1 | 10/2005 |
| WO | WO9617258 A3 | 2/1997 | | WO | WO2005098476 A1 | 10/2005 |

| | | | |
|---|---|---|---|
| WO | WO2006046400 A1 | 5/2006 | |
| WO | WO2006/061133 | 6/2006 | |
| WO | WO2006073248 A1 | 7/2006 | |
| WO | WO2006073248 A1 | 7/2006 | |
| WO | 2006089307 | 8/2006 | |
| WO | 2007028049 | 3/2007 | |
| WO | WO2007036490 A2 | 4/2007 | |
| WO | WO2007036490 A3 | 5/2007 | |
| WO | WO2007065033 A2 | 6/2007 | |
| WO | 2007137234 | 11/2007 | |
| WO | WO2007137234 A2 | 11/2007 | |

OTHER PUBLICATIONS

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.
Cameron Morland, *Autonomous Lawn Mower Control*, Jul. 24, 2002.
Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.
Electrolux designed for the well-lived home, website: http://www.electroluxusa.com/node57.as[?currentURL=node142.asp%3F, acessed Mar. 18, 2005, 5 pgs.
eVac Robotic Vacuum S1727 Instruction Manual, Sharper Image Corp, Copyright 2004, 16 pgs.
Everyday Robots, website: http://www.everydayrobots.com/index.php?option=content&task=view&id=9, accessed Apr. 20, 2005, 7 pgs.
Facts on the Trilobite webpage: "http://trilobiteelectroluxse/presskit_en/nodel1335asp?print=yes&pressID=" accessed Dec. 12, 2003 (2 pages).
Friendly Robotics Robotic Vacuum RV400-The Robot Store website: http://www.therobotstore.com/s.nl/sc.9/category,-109/it.A/id.43/.f, accessed Apr. 20, 2005, 5 pgs.
Hitachi: News release: The home cleaning robot of the autonomous movement type (experimental machine) is developed, website: http://www.i4u.com/japanreleases/hitachirobot.htm., accessed Mar. 18, 2005, 5 pgs.
Kärcher Product Manual Download webpage: "http://wwwkarchercom/bta/downloadenshtml?ACTION=SELECT-TEILENR&ID=rc3000&submitButtonName=Select+Product+Manual" and associated pdf file "5959-915enpdf (47 MB) English/English" accessed Jan. 21, 2004 (16 pages).
Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.
Kärcher RoboCleaner RC 3000 Product Details webpages: "http://wwwrobocleanerde/english/screen3html" through " . . . screen6html" accessed Dec. 12, 2003.
Karcher USA, RC3000 Robotic Cleaner, website: http://www.karcher-usa.com/showproducts.php?op=view_prod&param1=143&param2=&param3=, accessed Mar. 18, 2005.
koolvac Robotic Vacuum Cleaner Owner's Manual, Koolatron, Undated.
NorthStar Low-Cost, Indoor Localization, Evolution robotics, Powering Intelligent Products.
Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005.
Put Your Roomba . . . On "Automatic" webpages: "http://www.acomputeredge.com/roomba," accessed Apr. 20, 2005.
RoboMaid Sweeps Your Floors So You Won't Have To, the Official Site, website: http://www.thereobomaid.com/, acessed Mar. 18, 2005.
Robot Review Samsung Robot Vacuum (VC-RP3OW), website: http://www.onrobo.com/reviews/At_Home/Vacuun_Cleaners/on00vcrp30rosam/index.htm, accessed Mar. 18, 2005.
Robotic Vacuum Cleaner-Blue, website: http://www.sharperimage.com/us/en/catalog/productview.jhtml?sku=S1727BLU, accessed Mar. 18, 2005.
Wired News: Robot Vacs Are in the House, website: http://www.wired.com/news/print/0,1294,59237,00.html, accessed Mar. 18, 2005.
Zoombot Remote Controlled Vaccum-RV-500 NEW Roomba 2, website: http://cgi.ebay.com/ws/eBayISAPI.dll?ViewItem&category=43526&item=4373497618&rd=1, accessed Apr. 20, 2005.
Prassler et al., A Short History of Cleaning Robots, Autonomous Robots 9, 211-226, 2000, 16 pages.
U.S. Appl. No. 60/605,066, filed Aug. 27, 2004, Taylor.
U.S. Appl. No. 60/605,181, filed Aug. 27, 2004, Taylor.
ASCII.jp, http://ascii.jp/elem/000/000/330/330024/, 7 pages, accessed Nov. 1, 2011.
CleanMATE 365, Intelligent Automatic Vacuum Cleaner, Model No. QQ-1, User Manual, www.metapo.com/support/user_manual.pdf, 11 pages.
Dyson's Robot Vacuum Cleaner—the DC06, May 2, 2004, http://www.gizmag.com/go/1282/, accessed Nov. 11, 2011.
Electrolux Trilobite, http://www.electrolux-ui.com:8080/2002%5C822%5C833102EN.pdf, 10 pages.
Electrolux Trilobite, Time to enjoy life, 38 pages, http://www.robocon.co.kr/trilobite/Presentation_Trilobite_Kor_030104.ppt, accessed Dec. 22, 2011.
Electrolux, Welcome to the Electrolux trilobite, www.electroluxusa.com/node57.asp?currentURL=node142.asp%3F, 2 pages, accessed Mar. 18, 2005.
Euroflex Intelligente Manual (English only excerpt), 15 pages.
Euroflex, Jan. 1, 2006, http://www.euroflex.tv/novita_dett.php?id=15 , 1 page, Nov. 1, 2011.
Facts on the Trilobite, http://www.frc.ri.cmu.edut~hpm/talks/Extras/trilobite.desc.html, 2 pages, accessed Nov. 1, 2011.
FloorBotics, VR-8 Floor Cleaning Robot, Product Description for Manufacturers, http://www.consensus.com.au/SoftwareAwards/CSAarchive/CSA2004/CSAart04/FloorBot /FX1%20Product%20Description%2020%20January%202004.pdf, 11 pages.
Friendly Robotics, 18 pages, http://www.robotsandrelax.com/PDFs/RV400Manual.pdf, accessed Dec. 22, 2011.
Hitachi, May 29, 2003, http://www.hitachi.co.jp/New/cnews/hl_030529_hl_030529.pdf, 8 pages, accessed Jan. 3, 2012.
IT media, http://www.itmedia.co.jp/news/0111/16/robofesta_m.html, accessed Nov. 1, 2011.
It's eye, 2003, www.hitachi.co.jp/rd/pdf/topics/hitac2003_10.pdf, 2 pages.
Jarosiewicz et al., Final Report—Lucid University of Florida, Departmetn of Electrical and Computer Engineering, EEL 5666—Intelligent Machine Design Laboratory, 50 pages, Aug. 4, 1999.
Kahney Robot Vacs are in the House, Jun. 16, 2003, www.wired.com/news/technology/o,1282,59237,00.html , 6 pages, accessed Mar. 18, 2005.
Karcher Product Manual Download Karch, www.karcher.com , 17 pages, 2004.
Koolatron,KOOLVAC—Owner's Manual 13 pages.
Matsumura Camera Online Shop, webpage: http://www.rakuten.co.jp/matsucame/587179/711512/, accessed Nov. 1, 2011.
Microbot,Home Robot—UBOT www.micorobotusa.com/product_1_1_.html , 2 pages, accessed Dec. 2, 2008.
OnRobo, Samsung Robot Vacuum (VC-RP3OW), http://www.onrobo.com/reviews/At-Home/Vacuum_Cleaners/on00vcrp30rosam/index.htm, 2 pages, accessed Mar. 18, 2005.
OnRobo,Samsung Unveils Its Multifunction Robot Vacuum, www.onrobo.com/enews/0210/samsung_vacuum.shtml , 3 pages, accessed Mar. 18, 2005.
Popco.net Make your Digital Life, http://www.popco.net/zboard/view.php?id=tr_review&no=40, accessed Nov. 1, 2011.
Roboking—not just a vacuum cleaner, a robot!, Jan. 21, 2004, 5 pages.
Robot Buying Buide, LG announces the first robotic vacuum cleaner of Korea, Apr. 21, 2003, http://robotbg.com/news/2003/04/22/Ig_announces_the_first_robotic_vacuum_cleaner_of_korea, accessed Nov. 1, 2011.

Schwierige Beschaffung, Maschinemarkt Das IndustrieMagazin, Nr. 27, pp. 3, 30, Jul. 5, 1999.

Special Reports, Vacuum Cleaner Robot Operated in Conjunction with 3G Cellular Phone, vol. 59, No. 9 (2004), 3 pages, http://www.toshiba.co.jp/tech/review/2004/09/59_09pdf/a13.pdf, accessed Dec. 22, 2011.

Taipei Times, Robotic vacuum by Matsushita about to ungergo field testing, Mar. 26, 2002, http://www.taipeitimes.com/News/worldbiz/archives/2002/03/26/0000129338, accessed Dec. 22, 2011.

Tech-On!, http://techon.nikkeibp.co.jp/members/01db/200203/1006501/, 4 pages, accessed Nov. 1, 2011.

The Sharper Image, E Vac Robotic Vacuum, www.sharperiamge.com/us/en/templates/products/pipmorework1printable.jhtml , 2 pages, accessed Mar. 18, 2005.

The Sharper Image,e-Vac Robotic Vacuum, S1727 Instructions,www.sharperimage.com, 18 pages.

Toshiba Corporation, 2003, http://warp.ndl.go.jp/info:ndljp/pid/258151/www.soumu.go.jp/joho_tsusin/policyreports/chousa/netrobot/pdf/030214_1_33_a.pdf, 16 pages.

UBOT, cleaning robot capable of wiping with a wet duster, http://us.aving.net/news/view.php?articleld=23031, 4 pages, accessed Nov. 1, 2011.

Yujin Robotics, an intelligent cleaning robot 'iclebo Q' AVING USA, http://us.aving.net/news/view.php?articleld=7257, 8 pages, accessed Nov. 4, 2011.

OnRobo "Samsung Unveils Its Multifunction Robot Vacuum", www.onrobo.comienews/0210/samsung_vacuum.shtml, 3 pages, Mar. 18, 2005.

Pages et al. "Optimizing Plane-to-Plane Positioning Tasks by Image-Based Visual Servoing and Structured Light". IEEE Transactions on Robotics. vol. 22, No. 5. pp. 1000-1010, Oct. 2006.

Pages et al. "A camera-projector system for robot positoning by visual servoing", Proceedings of the 2006 Conference on Computer Vision and Pattern Recognition Workshop (CVPRW06), 8 pages, Jun. 17-22, 2006.

Pages, et al. "Robust decoupled visual servoing based on structured light", 2005 IEEE/RSJ Int. Conf. on Intelligent Robots and Systems, pp. 2676-2681, 2005.

Park et al. "A Neural Network Based Real-Time Robot Tracking Controller Using Position Sensitive Detectors." IEEE World Congress on Computational Intelligence., 1994 IEEE International Conference on Neutral Networks, Orlando, Florida pp. 2754-2758, Jun. 27-Jul. 2, 1994.

Park, et al. "Dynamic Visual Servo Control of Robot Manipulators using Neutral Networks". The Korean Institute Telematics and Electronics, vol. 29-B, No. 10. pp. 771-779, Oct. 1992.

Paromtchik "Toward Optical Guidance of Mobile Robots".

Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).

Penna, et al. "Models for Map Building and Navigation", IEEE Transactions on Systems. Man. And Cybernetics, vol. 23 No. 5, pp. 1276-1301. Sep./Oct. 1993.

Pirjanian "Reliable Reaction". Proceedings of the 1996 IEEE/SICE/RSJ International Conference on Multisensor Fusion and Integration for lntelligent Systems, pp. 158-165, 1996.

Pirjanian "Challenges for Standards for consumer Robotics", IEEE Workshop on Advanced Robotics and its Social impacts, pp. 260-264, Jun. 12-15, 2005.

Pirjanian et al. "Distributed Control for a Modular, Reconfigurable Cliff Robot", Proceedings of the 2002 IEEE International Conference on robotics & Automation, Washington, D.C. pp. 4083-4088, May, 2002.

Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.

Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr., 2000.

Pirjanian et al. "A decision-theoretic approach to fuzzy behavior coordination", 1999 IEEE International Symposium on Computational Intelligence in Robotics and Automation, 1999. CIRA '99., Monterey, CA, pp. 101-106. Nov. 8-9, 1999.

Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430. Apr., 1997.

Prassler et al., "A Short History of Cleaning Robots", Autonomous Robots 9, 211-226, 2000, 16 pages.

Radio Frequency Identification: Tracking ISS Consumables, Author Unknown, 41 pages (NPL0127).

Remazeilles, et al. "Image based robot navigation in 3D environments", Proc. of SPIE, vol. 6052, pp. 1-14, Dec. 6, 2005.

Rives, et al. "Visual servoing based on ellipse features", SPIE vol. 2056 Intelligent Robots and Computer Vision pp. 356-367, 1993.

Robotics World Jan 2001: "A Clean Sweep" (Jan. 2001).

Ronnback "On Methods for Assistive Mobile Robots", http://www.openthesis.org/documents/methods-assistive-mobile-robots-595019.html, 218 pages, Jan. 1, 2006.

Roth-Tabak, et al. "Environment Model for mobile Robots Indoor Navigation", SPIE vol. 1388 Mobile Robots pp. 453-463, 1990.

Sadath M Maiik et al. "Virtual Prototyping for Conceptual Design of a Tracked Mobile Robot". Electrical and Computer Engineering, Canadian Conference on, IEEE, Pl. May 1, 2006, pp. 2349-2352.

Sahin, et al. "Development of a Visual Object Localization Module for Mobile Robots", 1999 Third European Workshop on Advanced Mobile Robots, (Eurobot '99), pp. 65-72, 1999.

Salomon, et al. "Low-Cost Optical Indoor Localization system for Mobile Objects without Image Processing", IEEE Conference on Emerging Technologies and Factory Automation, 2006. (ETFA '06). pp. 629-632, Sep. 20-22, 2006.

Sato "Range Imaging Based on Moving Pattern Light and Spatio-Temporal Matched Filter", Proceedings International Conference on Image Processing, vol. 1., Lausanne, Switzerland. pp. 33-36, Sep. 16-19, 1996.

Schenker et al. "Lightweight rovers for Mars science exploration and sample return", Intelligent Robots and Computer visiion XVI, SPIE Proc. 3208, pp. 24-36, 1997.

Sebastian Thrun, Learning Occupancy Grid Maps With Forward Sensor Models, School of Computer Science, Carnegie Mellon University, pp. 1-28.

Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050. 1994.

Sim, et al "Learning Visual Landmarks for Pose Estimation", IEEE International Conference on Robotics and Automation, vol. 3, Detroit, MI, pp. 1972-1978, May 10-15, 1999.

Sobh et al. "Case Studies in Web-Controlled Devices and Remote Manipulation", Automation Congress, 2002 Proceedings of the 5th Biannual World. pp. 435-440, Dec. 10, 2002.

Stella et al. "Self-Location for Indoor Navigation of Autonomous Vehicles", Part of the SPIE conference on Enhanced and Synthetic Vision SPIE vol. 3364 pp. 298-302, 1998.

Summet "Tracking Locations of Moving Hand-held Displays Using Projected Light", Pervasive 2005, LNCS 3468 pp. 37-46 (2005).

Svedman et al. "Structure from Stereo Vision using Unsynchronized Cameras for Simultaneous Localization and Mapping". 2005 IEEE/RSJ International Conference on Intelligent Robots and Systems, pp. 2993-2998, 2005.

Takio et al. "Real-Time Position and Pose Tracking Method of Moving Object Using Visual Servo System", 47th IEEE International Symposium on Circuits and Systems, pp. 167-170, 2004.

Teller "Pervasive pose awareness for people, Objects and Robots", http://www.ai.mit.edu/lab/dangerous-ideas/Spring2003/teller-pose.pdf, 6 pages, Apr. 30, 2003.

Terada et al. "An Acquisition of the Relation between Vision and Action using Self-Organizing Map and Reinforcement Learning", 1998 Second International Conference on Knowledge-Based Intelligent Electronic Systems. Adelaide, Australiam pp. 429-434, Apr. 21-23, 1998.

The Sharper Image "e-Vac Robotic Vacuum, S1727 Instructions"www.sharperimage.com, 18 pages.

The Sharper Image "Robotic Vacuum Cleaner—Blue" www.Sharperimage.com, 2 pages, Mar. 18, 2005.
The Sharper Image "E Vac Robotic Vacuum"www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/it.A/id.43/.f, 1 page, Apr. 20, 2005.
TotalVac.com RC3000 RoboCleaner website Mar. 18, 2005.
Trebi-Ollennu et al. "Mars Rover Pair Cooperatively Transporting a Long Payload", Proceedings of the 2002 IEEE, International Conference on Robotics & Automation, Washington, D.C. pp. 3136-3141, May, 2002.
Tribelhorn et al., "Evaluating the Roomba: A low cost, ubiquitous platform for robotics research and eduation," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005.
Watanabe et al. "Position Estimation of Mobile Robots With Internal and External Sensors Using Uncertainty Evolution Technique", 1990 IEEE international Conference on Robotics and Automation, Cincinnati, OH, pp. 2011-2016, May 13-18, 1990.
Watts "Robot, boldly goes where no man can", The Times—pp. 20, Jan. 1985.
Wijk et al. "Triangulation-Based Fusion of Sonar Data with Application in Robot Pose Tracking ", IEEE Transactions on Robotics and Automation, vol. 16, No. 6, pp. 740-752, Dec. 2000.
Jarosiewicz et al. "Final Report—Lucid", Unversity of Florida Deparmetn of Electrical and Computer Engineering, EEL 5666—Intelligent Machine Design Laboratory, 50 pages, Aug. 4, 1999.
Jensfelt, et al. "Active Global Localization for a mobile robot using multiple hypothesis tracking", IEEE Transactions on Robots and Automation vol. 17. No. 5, pp. 748-760. Oct. 2001.
Jeong, et al. "An intelligent map-buiding system for indoor mobile robot using low cost photo sensors", SPIE vol. 6042, 6 pages, 2005.
Kahney, "Robot Vacs are in the House," www.wired.com/news/technology/o,1282,59237,00.html, 6 pages, Jun. 18, 2003.
Karcher "Product Manual Download Karch", www.karcher.com, 17 pages, 2004.
Karcher "Karcher RoboCleaner RC 3000", www.robocleaner.de/english/screen3.html, 4 pages, Dec. 12, 2003.
Karcher USA "RC 3000 Robotics cleaner", www.karcher-usa.com, 3 pages, Mar. 18, 2005.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, et al Core Technologies for service Robotics, IEEE/RSJ International Conference on intelligent Robots and Systems (IROS 2004), vol. 3, pp. 2979-2984, Sep. 28-Oct. 2, 2004.
King "Heplmate-TM-Autonomous mobile Robots Navigation Systems", SPIE vol. 1388 Mobile Robots pp. 190-198, 1990.
Kleinberg, The Localization Problem for Mobile Robots, Laboratory for Computer Science, Massachusetts Institute of Technology, 1994 IEEE, pp. 521-531, 1994.
Knight, et al., "Localization and Identification of Visual Landmarks", Journal of Computing Sciences in Colleges, vol. 16 Issue 4, 2001 pp. 312-313, May 2001.
Kolodko et al. "Expermental System for Real-Time Motion Estimation", Proceedings of the 2003 IEEE/ASME InternationalConference on Advanced Intelligent Mechatronics (AIM 2003), pp. 981-986, 2003.
Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.
Koolatron "KOOLVAC—Owner's Manual", 13 pages.
Krotov, et al. "Digital Sextant", Downloaded from the internet at: http://www.cs.cmu.edu/~epk/, 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.
Kuhl et al. "Self Localization in Environments using Visual Angles", VRCAI '04 Poceedings of the 2004 ACM SIGGRAPH international conference on Virtual Reality continuum and its applications in industry, pp. 472-475, 2004.
Kurth, "Range-Only Robot Localization and SLAM with Radio", http://www.ri.cmu.edu/pub_files/pub4/kurth_derek_2004_1/kurth_derek_2004_1.pdf. 60 pages, May, 2004.
Lambrinos, et al. "A mobile robot employing insect strategies for navigation", http://www8.cs.umu.se/kurser/TDBD17/VT04k/dl/Assignment%20Papers/lambrinos-RAS-2000.pdf, 38 pages, Feb. 19, 1999.
Lang et al. "Visual Measurement of Orientation Using Ceiling Features", 1994 IEEE, pp. 552-555, 1994.
Lapin, "Adaptive position estimation for an automated guided vehicle", SPIE vol. 1831 Mobile Robots VII, pp. 82-94, 1992.
LaValle et al. "Robot Motion Planning in a Changing, Partially Predictable Environment", 1994 IEEE International Symposium on Intelligent Control, Columbus, OH, pp. 261-266, Aug. 16-18, 1994.
Lee, et al. "Localization Of a Mobile Robot Using the Image of a Moving Object", IEEE Transaction on Industrial Electronics, vol. 50, No. 3 pp. 612-619, Jun. 2003.
Lee, et al. "Development of Indoor Navigation system for Humanoid Robot Using Multi-sensors Integration", ION NTM, San Diego, CA pp. 798-805, Jan. 22-24, 2007.
Leonard, et al. "Mobile Robot Localization by tracking Geometric Beacons", IEEE Transaction on Robotics and Automation, vol. 7, No. 3 pp. 376-382, Jun. 1991.
Li et al. "Robost Statistical Methods for Securing Wireless Localization in Sensor Networks", Wireless Information Network Laboratory, Rutgers University.
Li et al. "Making a Local Map of Indoor Environments by Swiveling a Camera and a Sonar", Proceedings of the 1999 IEEE/RSJ International Conference on Intelligent Robots and Systems, pp. 954-959, 1999.
Lin, et al., "Mobile Robot Navigation Using Artificial Landmarks", Journal of robotics System 14(2). pp. 93-106, 1997.
Linde "Dissertation, "On Aspects of Indoor Localization"" https://eldorado.tu-dortmund.de/handle/2003/22854, University of Dortmund, 138 pages, Aug. 28, 2006.
Lumelsky, et al. "An Algorithm for Maze Searching with Azimuth Input", 1994 IEEE Internationai Conference on Robotics and Automation, San Diego. CA vol. 1, pp. 111-116, 1994.
Luo et al., "Real-time Area-Covering Operations with Obstacle Avoidance for Cleaning Robots," 2002, IEeE, p. 2359-2364.
Ma "Thesis: Documentation On Northstar", California Institute of Technology, 14 pages, May 17, 2006.
Madsen, et al. "Optimal landmark selection for triangulation of robot position", Journal of Robotics and Autonomous Systems vol. 13 pp. 277-292, 1998.
Martishevcky, "The Accuracy of point light target coordinate determination by dissectoral tracking system", SPIE vol. 2591 pp. 25-30.
Matsutek Enterprises Co. Ltd "Automatic Rechargeable Vacuum Cleaner", http://matsutek.manufacturer.globalsources.com/si/6008801427181/pdtl/Home-vacuum/10 . . . , Apr. 23, 2007.
McGillem, et al. "Infra-red Lacation System for Navigation and Autonomous Vehicles", 1988 IEEE International Conference on Robotics and Automation, vol. 2, pp. 1236-1238, Apr. 24-29, 1988.
McGillem, et al. "A Beacon Navigation Method for Autonomous Vehicles", IEEE Transactions on Vehicular Technology, vol. 38. No. 3, pp. 132-139, Aug. 1989.
Michelson "Autonomous Navigation", 2000 Yearbook of Science & Technology, McGraw-Hill, New York, ISBN 0-07-052771-7, pp. 28-30, 1999.
Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.
Monteiro, et al. "Visual Servoing for Fast Mobile Robot: Adaptive Estimation of Kinematic Parameters", Proceedings of the IECON '93., International Conference on Industrial Electronics, Maui, HI pp. 1588-1593, Nov. 15-19, 1993.
Moore, et al. A simple Map-bases Localization strategy using range measurements, SPIE vol. 5804 pp. 612-620, 2005.
Munich et al. "SIFT-ing Through Features with ViPR", IEEE Robotics & Automation Magazine, pp. 72-77, Sep. 2006.
Munich et al. "ERSP: A Software Platform and Architecture for the Service Robotics Industry", Intelligent Robots and Systems, 2005. (IROS 2005), pp. 460-467, Aug. 2-6, 2005.
Nam, et al. "Real-Time Dynamic Visual Tracking Using PSD Sensors and extended Trapezoidal Motion Planning", Applied Intelligence 10, pp. 53-70, 1999.
Nitu et al. "Optomechatronic System for Position Detection of a Mobile Mini-Robot", IEEE Ttransactions on Industrial Electronics, vol. 52, No. 4, pp. 969-973, Aug. 2005.
On Robo "Robot Reviews Samsung Robot Vacuum (VC-RP3OW)", www.onrobo.com/reviews/AT_Home/vacuum_cleaners/on00vcrb30rosam/index.htm. 2 pages, 2005.
InMach "lntelligent Machines", www.inmach.de/inside.html, 1 page, Nov. 19, 2008.
Innovation First "2004 EDU Robot Controller Reference Guide", http://www.ifirobotics.com, 13 pgs., Mar. 1, 2004.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May, 2002.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", EE Online ID# 13114, 17 pages, Jul. 2006.
Yamamoto et al. "Optical Sensing for Robot Perception and Localization", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium, pp. 1590-1596, May, 1998.
Yun, et al. "Image-Based Absolute Positioning System for Mobile Robot Navigation", IAPR International Workshops SSPR, Hong Kong, pp. 261-269, Aug. 17-19, 2006.
Yun, et al. "Robust Positioning a Mobile Robot with Active Beacon Sensors", Lecture Notes in Computer Science, 2006, vol. 4251, pp. 690-897, 2006.
Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.
Zha et al. "Mobile Robot Localization Using Incomplete Maps for Change Detection in a Dynamic Environment", Advanced Intelligent Mechatronics '97. Final Program and Abstacts., IEEE/ASME International Conference, pp. 110, Jun. 16-20, 1997.
Zhang, et al. "A Novel Mobile Robot Localization Based on Vision", SPIE vol. 6279, 6 pages, Jan. 29, 2007.
Euroflex Intellegente Monstre Mauele (English only except).
Roboking—not just a vacuum cleaner, a robot! Jan. 21, 2004, 5 pages.
SVET Computers—New Technologies—Robot vacuum cleaner, 1 page.
Popco.net Make your digital life http://www.popco.net/zboard/view.php?id=tr_review&no=40 accessed Nov. 1, 2011.
Matsumura Camera Online Shop http://www.rakuten.co.jp/matsucame/587179/711512/ acessed Nov. 1, 2011.
Dyson's Robot Vacuum Cleaner—the DC06, May 2, 2004 http://www.gizmag.com/go/1282/ accessed Nov. 11, 2011.
Electrolux Trilobite, http://www.electrolux-ui.com:8080/2002%5C822%5C833102EN.pdf 10 pages.
Electrolux Trilobite, Time to enjoy life, 38 pages http://www.robocon.co.kr/trilobite/Presentation_Trilobite_Kor_030104.ppt accessed Dec. 22, 2011.
Facts on the Trilobite http://www.frc.ri.cmu.edu/~hpm/talks/Extras/trilobite.desc.html 2 pages accessed Nov. 1, 2011.
Euroflex Jan. 1, 2006 http://www.euroflex.tv/novita_dett.php?id=15 1 page accessed Nov. 1, 2011.
FloorBotics, VR-8 Floor Cleaning Robot, Product Description for Manuafacturers, http://www.consensus.com.au/SoftwareAwards/CSAarchive/CSA2004/CSAart04/FloorBot/F.
Friendly Robotics, 18 pages http://www.robotsandrelax.com/PDFs/RV400Manual.pdf accessed Dec. 22, 2011.
It's eye, 2003 www.hitachi.co.jp/rd/pdf/topics/hitac2003_10.pdf 2 pages.
Hitachi, May 29, 2003 http://www.hitachi.co.jp/New/cnews/hl_030529_hl_030529.pdf 8 pages.
Robot Buying Guide, LG announces the first robotic vacuum cleaner for Korea, Apr. 21, 2003 http://robotbg.com/news/2003/04/22/lg_announces_the_first_robotic_vacu.
CleanMate 365, Intelligent Automatic Vacuum Cleaner, Model No. QQ-1, User Manual www.metapo.com/support/user_manual.pdf 11 pages.
UBOT, cleaning robot capable of wiping with a wet duster, http://us.aving.net/news/view.php?articleld=23031, 4 pages accessed Nov. 1, 2011.
Taipei Times, Robotic vacuum by Matsuhita about ot undergo testing, Mar. 26, 2002 http//www.taipeitimes.com/News/worldbiz/archives/2002/03/26/0000129338 accessed.
Tech-on! http://techon.nikkeibp.co.jp/members/01db/200203/1006501/, 4 pages, accessed Nov. 1, 2011.
http://ascii.jp/elem/000/000/330/330024/.
IT media http://www.itmedia.co.jp/news/0111/16/robofesta_m.html accessed Nov. 1, 2011.
Yujin Robotics, an intelligent cleaning robot 'iclebo Q' AVING USA http://us.aving.net/news/view.php?articleld=7257, 8 pages accessed Nov. 4, 2011.
Special Reports, Vacuum Cleaner Robot Operated in Conjunction with 3G Celluar Phone vol. 59, No. 9 (2004) 3 pages http://www.toshiba.co.jp/tech/review/2004/09/59_0.
Toshiba Corporation 2003, http://warp.ndl.go.jp/info:ndljp/pid/258151/www.soumu.go.jp/joho_tsusin/policyreports/chousa/netrobot/pdf/030214_1_33_a.pdf 16 pages.
http://www.karcher.de/versions/intg/assets/video/2_4_robo_en.swf. Accessed Sep. 25, 2009.
McLurkin "The Ants: A community of Microrobots", Paper submitted for requirements of BSEE at MIT, May 12, 1995.
Grumet "Robots Clean House", Popular Mechanics, Nov. 2003.
McLurkin Stupid Robot Tricks: A Behavior-based Distributed Algorithm Library for Programming Swarms of Robots, Paper submitted for requirements of BSEE at MIT, May 2004.
Kurs et al, Wireless Power transfer via Strongly Coupled Magnetic Resonances, Downloaded from www.sciencemag.org, Aug. 17, 2007.
Borges et al. "Optimal Mobile Robot Pose Estimation Using Geometrical Maps", IEEE Transactions on Robotics and Automation, vol. 18, No. 1, pp. 87-94, Feb. 2002.
Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.
Bulusu, et al. "Self Configuring Localization systems: Design and Experimental Evaluation", ACM Transactons on Embedded Computing systems vol. 3 No. 1 pp. 24-60, 2003.
Caccia, et al. "Bottom-Following for Remotely Operated Vehicies", 5th IFAC conference, Alaborg, Denmark, pp. 245-250 Aug. 1, 2000.
Chae, et al. "StarLITE: A new artificial landmark for the navigation of mobile robots", http://www.irc.atr.jp/jk-nrs2005/pdf/Starlite.pdf, 4 pages, 2005.
Chamberlin et al. "Team 1: Robot Locator Beacon System" NASA Goddard SFC, Design Proposal, 15 pages, Feb. 17, 2006.
Champy "Physical management of IT assets in Data Centers using RFID technologies", RFID 2005 University, Oct. 12-14, 2005 (NPL0126).

Chiri "Joystick Control for Tiny OS Robot"http://www.eecs.berkeley.ecu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Andersen et al., "Landmark based navigation strategies", SPIE Conference on Mobile Robots XIII, SPIE vol. 3525, pp.

Clerentin, et al. "A localization method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. of SPIE vol. 3965, pp. 1-12, May 15, 2000.

Desaulniers et al. "An Efficient Algorithm to find a shortest path for a car-like Robot", IEEE Transactions on robotics, and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorfmueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Dudek et al. "Localizing A Robot with Minimum Travel" Proceedings of the sixth annual ACM-SIAM symposium on Discrete algorithms, vol. 27 No. 2 pp. 583-604, Apr. 1998.

Dulimarta, et al. "Mobile Robot Localization in Indoor Environment", Pattern Recognition, vol. 30, No. 1, pp. 99-111, 1997.

EBay "Roomba Timer—>Timed Cleaning—Floorvac Robotic Vacuum", Cgi.ebay.com/ws/eBaylSAPI.dll?viewitem&category=43526&item=4375198387&rd=1, 5 pages, Apr. 20, 2005.

Electrolux "Welcome to the Electrolux trilobite", www.electroluxusa.com/node57.asp?currentURL=node142.asp%3F, 2 pages, Mar. 18, 2005.

Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95, pp. 548-551, 1995.

Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.

Barker, "Navigation by the Stars—Ben Barker 4th Year Project" Power point pp. 1-20.

Becker, et al. "Reliable Navigation Using Landmarks" IEEE International Conference on Robotics and Automation, 0-7803-1965-6, pp. 401-406, 1995.

Benayad-Cherif, et al., "Mobile Robot Navigation Sensors" SPIE vol. 1831 Mobile Robots, VII, pp. 378-387, 1992.

Facchinetti Claudio et al. "Using and Learning Vision-Based Self-Positoning for Autonomous Robot Navigation ", ICARCV '94, vol. 3 pp. 1694-1698, 1994.

Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol.

Facchinetti, Claudio et al. "Self-Positioning Robot Navigation Using Ceiling Images Sequences", ACCV '95, 5 pages, Dec. 5-6, 1995.

Fairfield, Nathaniel et al. "Mobile Robot Localization with Sparse Landmarks", SPIE vol. 4573 pp. 148-155, 2002.

Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.

Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.

Florbot GE Plastics Image (1989-1990).

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages Apr. 20, 2005.

Fuentes, et al. "Mobile Robotics 1994", University of Rochester. Computer Science Department, TR 588, 44 pages, Dec. 7, 1994.

Bison P et al., "Using a structured beacon for cooperative position estimation" Robotics and Autonomous Systems vol. 29, No. 1, pp. 33-40, Oct. 1999.

Fukuda, et al. "Navigation System based on Ceiling Landmark Recognition for Autonomous mobile robot". 1995 IEEE/RSJ International Conference on Intelligent Robots and Systems 95. 'Human Robot Interaction and Cooperative Robots', Pittsburgh, PA, pp. 1466/1471, Aug. 5-9, 1995.

Gionis "A hand-held optical surface scanner for environmental Modeling and Virtual Reality", Virtual Reality World, 16 pages 1996.

Goncalves et al. "A Visual Front-End for Simultaneous Localization and Mapping", Proceedings of the 2005 IEEE International Conference on Robotics and Automation, Barcelona, Spain, pp. 44-49, Apr. 2005.

Gregg et al. "Autonomous Lawn Care Applications", 2006 Florida Conference on Recent Advances in Robotics, FCRAR 2006, pp. 1-5, May 25-26, 2006.

Hamamatsu "SI PIN Diode S5980, S5981 S587—Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp?promo=xsells, 3 pages, Mar. 18, 2005.

Haralick et al. "Pose Estimation from Corresponding Point Data", IEEE Transactions on systems, Man, and Cybernetics, vol. 19, No. 6, pp. 1426-1446, Nov. 1989.

Hausler "About the Scaling Behaviour of Optical Range Sensors", Fringe '97, Proceedings of the 3rd International Workshop on Automatic Processing of Fringe Patterns, Bremen, Germany, pp. 147-155, Sep. 15-17, 1997.

Blaasvaer, et al. "AMOR—Autonomous Mobile Robot Navigaton System", Proceedings of the IEEE International, Conference on Systems, Man, and Cybernetics, pp. 2266-2271, 1994.

Hoag, et al. "Navigation and Guidance in interstellar space", ACTA Astronautica vol. 2, pp. 513-533, Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php?ubre=111, 3 pages, Mar. 18, 2005.

Karcher Product Manual Download webpage: http://www.karcher.com/bta/download.en.shtml?ACTION=SELECTTEILENR&ID=rc3000&submitButtonName=Select+Product+Manual and associated.pdf file "5959-915en.pdf (4.7 MB) English/English" accessed Jan. 21, 2004 (16 pages).

Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002.

Karcher RoboCleaner RC 3000 Product Details, webpages: "http://wwwrobocleaner.de/english/screen3.html" through " . . . screen6.html" Dec. 12, 2003, 4 pages.

Karcher USA, RC3000 Robotic Cleaner, website: http//www.karcher-usa.com/showproducts.php?op=viewprod&paraml=143&param2=&param3=, accessed Mar. 18, 2005, 6 pages.

koolvac Robotic Vacuum Cleaner Owner's Manual, Koolatron, Undated, 26 pages.

Morland, "Autonomous Lawnmower Control", Downloaded from the internet at:http://cns.bu.edu/~cjmorlan/robotics/lawnmower/report.pdf, 10 pages, Jul. 24, 2002.

Put Your Roomba . . . On "Automatic" webpages: "http://www.acomputeredge.com/roomba," accessed Apr. 20, 2005, 5 pages.

RoboMaid Sweeps Your Floors So You Won't Have to, the Official Site, website: http://therobomaid.com/, accessed Mar. 18, 2005, 2 pages.

Robot Review Samsung Robot Vacuum (VC-RP3OW), website: http://www.onrobo.com/review/At_Home/Vacuum_Cleaners/on00vcrp30rosam/index.htm, accessed Mar. 18, 2005, 11 pages.

Robotic Vacuum Cleaner-Blue website: http://www.shaperimage.com/us/en/catalog/productview.jhtml?sku=S1727BLU, accessed Mar. 18, 2005, 3 pages.

Schofield Monica "Neither Master nor slave" A Practical Study in the Development and Employment of Cleaning Robots, Emerging Technologies and Factory Automation, 1999 Proceedings ETFA '99 1999 7th IEEE International Conference on Barcelona, Spain, Oct. 18-21, 1999, pp. 1427-1434.

Wired News: Robot Vacs are in the House, website: http://www.wired.com/news/print/0,1294,59237,00.html, accessed Mar. 18, 2005, 6 pages.

Doty et al. "Sweep Strategies for a Sensory-Driven, Behavior-Based Vacuum Cleaning Agent", AAAI 1993 Fall Symposium Series, Instantiating Real-World Agents, pp. 1-6, Oct. 22-24, 1993 (NPL0129).

Zoombot Remote Controlled Vaccuum-RV-500 New Roomba 2, website: http://cgi.ebay.com/ws/eBayISAPI.dll?ViewItem&category=43526&item=4373497618&rd=1, accessed Apr. 20, 2005, 7 pages.

Electrolux "designed for the well-lived home", http://www.electroluxusa.com/node57.as[?currentURL=nodel42.asp%3F, accessed Mar. 18, 2005, 5 pgs.

Everyday Robots "Everyday Robots: Reviews, Discussion and News for Consumers", www.everydayrobots.com/index.php?option=content&task=view&id=9, Apr. 20, 2005, 7 pages.

Evolution Robotics "NorthStar—Low-cost indoor Localiztion—How it Works", E Evolution robotics, 2 pages, 2005.

Facts on Trilobite webpage: http://trilobiteelectroluxse/presskit_en/model11335asp?print=yes&pressID= accessed Dec. 12, 2003, 2 pages.

Friendly Robotics Robotic Vacuum RV400—The Robot Store website: www.therobotstore.com/s.nl/sc.9/category,-109/it.A/id.43/.f, accessed Apr. 20, 2005, 5 pages.

Gat, Erann "Robust Low-Computation Sensor-driven Control for Task-Directed Navigation", Proc of IEEE International Conference on robotics and Automation, Sacramento, CA pp. 2484-2489, Apr. 1991.

Hitachi "Feature", http://kadenfan.hitachi.co.jp/robot/feature/feature.html, 1 page Nov. 19, 2008.

Hitachi: News release: "The home cleaning robot of the autonomous movement type (experimental machine)", www.i4u.com./japanreleases/hitachirobot.htm, 5 pages, Mar. 18, 2005.

Andersen et al., "Landmark based navigation strategies", SPIE Conference on Mobile Robots XIII, SPIE vol. 3525, pp. 170-181, Jan. 8, 1999.

Ascii, Mar. 25, 2002, http://ascii.jp/elem/000/000/330/330024/ accessed Nov. 1, 2011.

Certified copy of U.S. Appl. No. 60/605,066 as provided to WIPO in PCT/US2005/030422, corresponding to U.S. Appl. No. 11/574,290, U.S. publication 2008/0184518, filing date Aug. 27, 2004.

Certified copy of U.S. Appl. No. 60/605,181 as provided to WIPO in PCT/US2005/030422, corresponding to U.S. Appl. No. 11/574,290, U.S. publication 2008/0184518, filing date Aug. 27, 2004.

Derek Kurth, "Range-Only Robot Localization and SLAM with Radio", http://www.ri.cmu.edu/pub_derek_2004_1/kurth_derek_2004_1.pdf. 60 pages, May, 2004, accessed Jul. 27, 2012.

Electrolux Trilobite, Jan. 12, 2001, http://www.electrolux-ui.com:8080/2002%5C822%5C833102EN.pdf, accessed Jul. 2, 2012, 10 pages.

Florbot GE Plastics, 1989-1990, 2 pages, available at http://www.fuseid.com/, accessed Sep. 27, 2012.

Gregg et al., "Autonomous Lawn Care Applications," 2006 Florida Conference on Recent Advances in robotics, Miami, Florida, May 25-26, 2006, Florida International University, 5 pages.

Hitachi 'Feature', http://kadenfan.hitachi.co.jp/robot/feature/feature.html, 1 page, Nov. 19, 2008.

Hitachi, http://www.hitachi.co.jp/New/cnews/hi_030529_hi_030529.pdf, 8 pages, May 29, 2003.

Home Robot—UBOT; Microbotusa.com, retrieved from the WWW at www.microrobotusa.com, accessed Dec. 2, 2008.

King and Weiman, "Helpmate™ Autonomous Mobile robots Navigation Systems," SPIE vol. 1388 Mobile Robots, pp. 190-198 (1990).

Li et al. "Robust Statistical Methods for Securing Wireless Localization in Sensor Networks," Information Procesing in Sensor Networks, 2005, Fourth International Symposium on, pp. 91-98, Apr. 2005.

Martishevcky, "The Accuracy of point light target coordinate determination by disectoral tracking system", SPIE vol. 2591, pp. 25-30, Oct. 23, 2005.

Maschinemarkt Würzburg 105, Nr. 27, pp. 3, 30, Jul. 5, 1999.

Miwako Doi "Using the symbiosis of human and robots from approaching Research and Development Center, " toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 25, 2003.

Paromtchik "Toward Optical Guidance of Mobile Robots," Proceedings of the Fourth World Multiconference on Systemics, Cybernetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

SVET Computers—New Technologies—Robot Vacuum Cleaner, Oct. 1999, available at http://www.sk.rs/1999/10/sknt01.html, accessed Nov. 1, 2011.

Written Opinion of the International Searching Authority, PCT/US2004/001504, Aug. 20, 2012, 9 pages.

Kwon et al., "Table Recognition through Range-based Candidate Generation and Vision based Candidate Evaluation," *ICAR 2007, The 13th International Conference on Advanced Robotics* Aug. 21-24, 2007, Jeju, Korea, 918-923 (2007).

\* cited by examiner

ROBOT CONFINEMENT

CROSS-REFERENCE TO RELATED APPLICATIONS

This application is a continuation of and claims priority from U.S. Non-provisional patent application Ser. No. 11/929,558, filed Oct. 30, 2007, now U.S. Pat. No. 7,579,803 which is a continuation of and claims the benefit of priority from U.S. Non-provisional patent application Ser. No. 11/691,735, filed Mar. 27, 2007, now abandoned which is a continuation of and claims the benefit of priority from U.S. Non-provisional patent application Ser. No. 11/221,392, filed Sep. 8, 2005, (now U.S. Pat. No. 7,196,487), which is a continuation of and claims the benefit of priority from U.S. Non-provisional patent application Ser. No. 10/921,775, filed Aug. 19, 2004, (now U.S. Pat. No. 6,965,209), which is a continuation of and claims the benefit of priority from U.S. Non-provisional patent application Ser. No. 10/696,456, filed Oct. 29, 2003, (now U.S. Pat. No. 6,781,338), which is a divisional of and claims the benefit of priority from U.S. Non-provisional patent application Ser. No. 10/056,804, filed Jan. 24, 2002, (now U.S. Pat. No. 6,690,134), which claims the benefit of priority from U.S. Provisional Patent Application Ser. No. 60/263,692, filed Jan. 24, 2001, which applications are incorporated herein by reference.

BACKGROUND OF THE INVENTION

The invention relates to a method and system for robot localization and confinement.

There have been many systems proposed in the prior art for confining a robot to specific physical space for the purpose of performing work. These systems are typically designed for any number of robotic applications such as lawn care, floor cleaning, inspection, transportation, and entertainment, where it is desired to have a robot operate in a confined area for performing work over time.

By way of example, a vacuuming robot working in one room may unintentionally wander from one room to another room before satisfactorily completing the vacuuming of the first room. One solution is to confine the robot to the first room by closing all doors and physically preventing the robot from leaving the first room. In many houses, however, open passageways often separate rooms, and doors or other physical barriers cannot easily be placed in the robot's exit path. Likewise, a user may desire to only have the robot operate in a portion of a single open space and, therefore, letting the robot work in the entire room decreases efficiency.

It is therefore advantageous to have a means for confining the area in which a robot works.

One approach in the prior art is to provide sophisticated systems for navigation and orientation for the robot such that the robot either travels along a predetermined path and/or monitors its current location against a map stored in memory. These systems require sophisticated hardware, such as precision sensors and significant computer memory and computational power, and typically do not adapt well to changes in the area in which the robot is working. Likewise the robot cannot simply be taken from one building to another building, or even from room-to-room, without significant reprogramming or training.

For example, the method disclosed in U.S. Pat. No. 4,700,427 (Knepper) requires a means for generating a path for the robot to travel, which can be either a manually-controlled teaching of the path or automatic mapping function. If "the place of use is frequently changed" or the "rooms are modified," large amounts of data memory is required in order to store information related to each location. Similarly, the method and system disclosed in U.S. Pat. No. 4,119,900 (Kremnitz) requires powerful computation and sensors to constantly ascertain the orientation of the robot in a given space. Other examples of robotic systems requiring inputted information about the space in which the robot is working include methods and systems shown in U.S. Pat. Nos. 5,109,566 (Kobayashi et al.) and 5,284,522 (Kobayashi et al.).

Similarly, certain prior art systems not only require the training or programming of the robot to the specifics of a particular space, but also require some preparation or alteration to the space in which the robot is to work. For example, U.S. Pat. No. 5,341,540 (Soupert et al.) discloses a system in which in a preferred embodiment requires the robot to include a positioning system and that the area for the robot be set up with "marking beacons . . . placed at fixed reference points." While this system can avoid an unknown obstacle and return to its preprogrammed path through signals from the beacons, the system requires both significant user set-up and on-board computational power.

Similar systems and methods containing one or more of the above-described disadvantages are disclosed in U.S. Pat. Nos. 5,353,224 (Lee et al.), 5,537,017 (Feiten et al.), 5,548,511 (Bancroft), and 5,634,237 (Paranjpe).

Yet another approach for confining a robot to a specified area involves providing a device defining the entire boundary of the area. For example, U.S. Pat. No. 6,300,737 (Bergvall et al.) discloses an electronic bordering system in which a cable is placed on or under the ground to separate the inner area from the outer area. Likewise, the system disclosed in U.S. Pat. No. 6,255,793 (Peless et al.) requires installation of a metallic wire through which electricity flows to define a border. While these systems provide an effective means for confinement, they are difficult to install, are not portable from room-to-room, and can be unsightly or a tripping hazard if not placed under ground or beneath carpeting. Equally important, such systems can be difficult to repair if the wire or other confinement device breaks, as the location of such breaks can be difficult to determine when the system is placed underground or under carpet.

The present invention provides a modified and improved system for confining a robot to a given space without the drawbacks of the prior art.

SUMMARY OF THE INVENTION

In accordance with the present invention a robot confinement system is disclosed comprising: a portable barrier signal transmitter, wherein said barrier signal is transmitted primarily along an axis, said axis defining a barrier; a mobile robot, where said mobile robot comprises means for turning in at least one direction, a barrier signal detector, and a control unit controlling said means for turning; whereby the control unit runs an algorithm for avoiding said barrier signal upon detection of said barrier signal, said algorithm comprising the step of turning the robot until said barrier signal is no longer detected.

Accordingly, the present invention has several objects and advantages.

It is an object of the invention to provide a simplified and portable system and method for confining a robot to a given area.

It is an object of the invention to provide a confinement system that does not require installation.

It is an object of the invention to provide a barrier system that can be set up intuitively and includes a means for visually indicating the barrier.

It is an additional object of the invention to provide a system such that a robot approaching the barrier from either side of the barrier will turn in such a way as to avoid crossing the barrier.

It is an object of the invention to provide a robot confinement system that operates regardless of the angle at which the robot approaches the barrier.

It is an additional object of a preferred embodiment of the invention to provide a system that is substantially impervious to the effects of sunlight, will not cause interference with other devices, and will not be interfered by other devices.

The preferred embodiment of the present invention is for a robotic, indoor cleaning device similar to the types disclosed in U.S. Pat. Nos. 4,306,329 (Yokoi), 5,293,955 (Lee), 5,369,347 (Yoo), 5,440,216 (Kim), 5,613,261 (Kawakami et al.), 5,787,545 (Colens), 5,815,880 (Nakanishi), 6,076,226 (Reed). One of skill in the art will recognize that the present invention can be used in any number of robotic applications where confinement is desired. In addition, while the preferred embodiments described herein are for a robot without a navigation system, one of skill in the art will recognize the utility of the invention in applications using more sophisticated robots.

Other features and advantages of the invention will be apparent from the following detailed description, including the associated drawings, and from the claims.

DETAILED DESCRIPTION

Figure 1A:
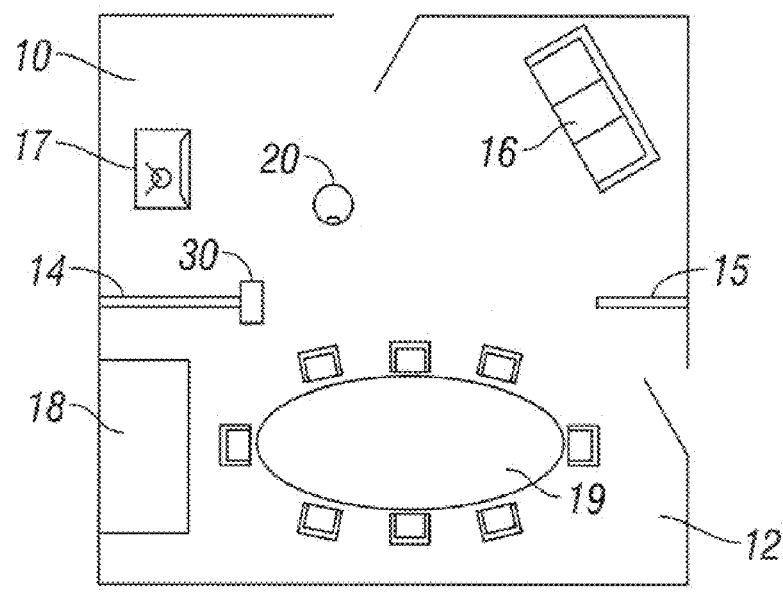
FIG. 1A shows an embodiment of the robot confinement system according to the invention with the barrier signal transmitter in an unpowered state.
Figure 1B:
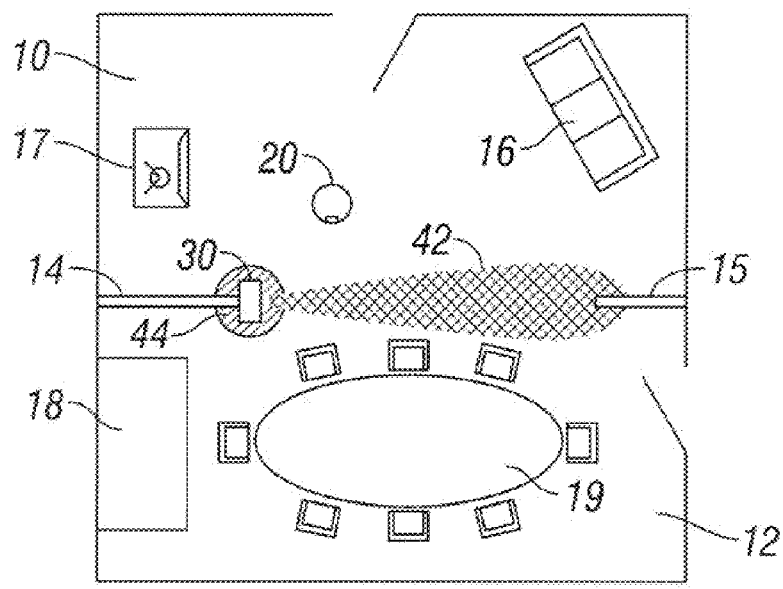
FIG. 1B shows an embodiment of the robot confinement system according to the invention with the barrier signal transmitter in a powered state.

Referring to FIGS. 1A & 1B, living room 10 is shown separated from dining room 12 by interior walls 14 & 15. The living room and/or dining room may contain various furnishings, for example, couch 16, television 17, buffet 18 and table and chairs 19.

The rooms also contain a mobile robot 20 and a barrier signal transmitting device 30, which for purposes of this specification is also called a robot confinement (or RCON) transmitter 30. In FIGS. 1A & 1B, the robot is placed in the living room 10, and the RCON transmitter 30 is placed in the area dividing the living room 10 from the dining room 12, against interior wall 14 and pointing toward interior wall 15.

As described in more detail herein, FIG. 1B shows the same configuration of rooms with the RCON transmitter 30 in a powered state emitting, e.g., an infrared beam 42 from the RCON transmitter 30 toward interior wall 15. The beam 42 is directed primarily along an axis to create a boundary or barrier between living room 10 and dining room 12.

The system and method described herein each rely on a portable RCON transmitting unit 30 and a mobile robot 20. Each of these elements is first described independently, then the operation of a preferred embodiment of the invention is discussed.

RCON Transmitter

Figure 2A:
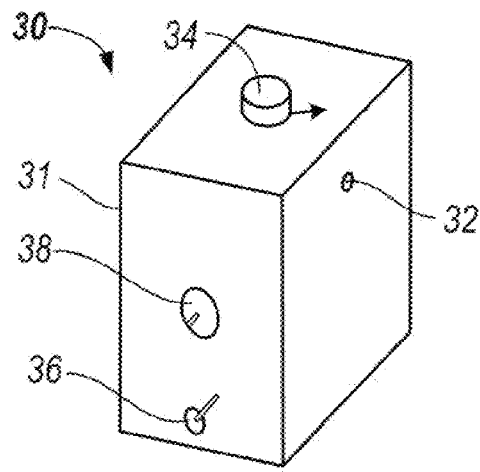
FIG. 2A shows a schematic representation of a preferred embodiment of the barrier signal transmitter.
Figure 2B:
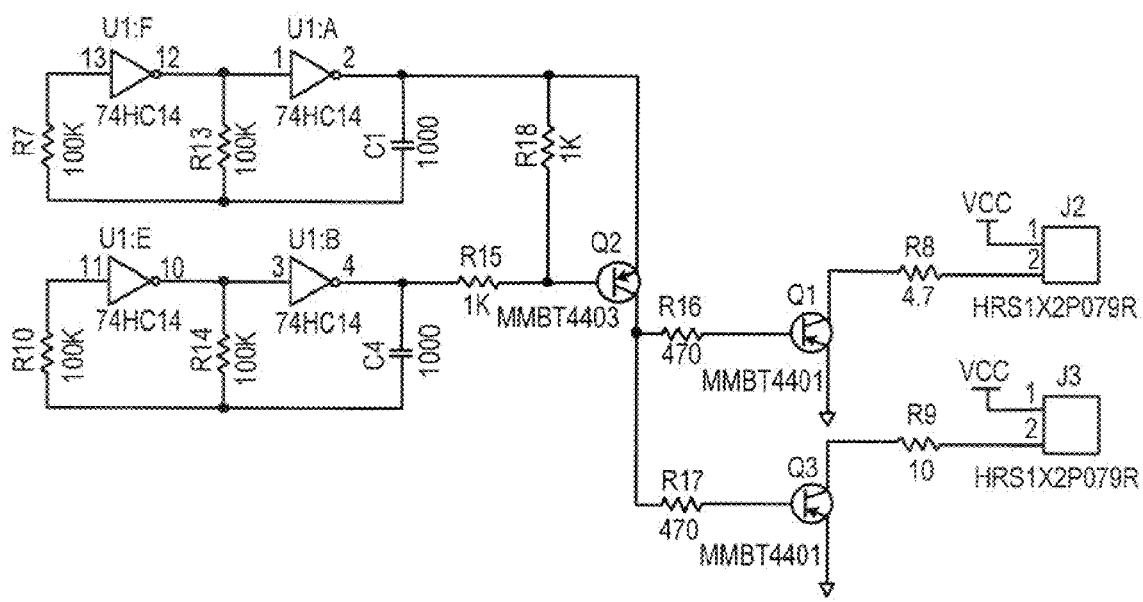
FIG. 2B shows a circuit diagram of a specific embodiment of the barrier signal transmitter.

FIG. 2A illustrates a preferred embodiment of the RCON transmitter 30. The RCON transmitter 30 includes a first infrared emitter 32, a second infrared emitter 34, a power switch 36, and variable power-setting knob 38. The RCON transmitter enclosure 31 also houses the batteries (not shown) and necessary electronics for the various components. FIG. 2B shows a circuit diagram for the necessary electronics for an embodiment of the RCON transmitter 30. Other embodiments may use other conventional power sources.

In the embodiment shown in FIG. 2A, a user would turn on the RCON transmitter 30 using power switch 36 at the same time as the robot 20 begins operation. The user can also select a variable power using knob 38. In other embodiments, any number of known input devices can be used to turn on the unit and/or select a power setting, such as keypads, toggle switches, etc. A higher power can be used to provide a longer barrier useful for dividing a single room, while a lower power setting can be used to provide a barrier for a single doorway. Because of the reflective properties of various materials such as walls painted white, it is preferable to limit the power of the RCON transmitter 30 to the minimum necessary to provide the desired barrier.

In alternative embodiments, the RCON transmitter's power may be automatically turned off after a predetermined amount of time in order to preserve battery life.

In alternative embodiments, a control system can be used to turn on and turn off one or more RCON transmitters and/or robots in order to allow automatic cleaning of multiple rooms or spaces in a controlled manner. For example, a "smart house" control system might communicate directly with one or more RCON transmitters allowing a cycling of work spaces. In the alternative, the robot 20 might send a signal to the RCON to turn it on.

In the preferred embodiment, two infrared emitters 32 & 34 are used. The first IR emitter 32—the primary emitter—is powered to provide a directed barrier 42 of a given length from the RCON transmitter 30. In this embodiment, the beam 42 is a modulated, narrow IR beam. In the preferred embodiment, a collimated IR emitter is used such as Waitrony p/n IE-320H. The specifics of the emitter(s) are left to one of skill in the art; however, as explained in detail below, the beam 42 must have sufficient width. It is preferred that the minimum beam width be greater than the turning radius of the detector on a particular robot.

The second IR emitter 34—the secondary emitter—is powered to provide a diffuse region 44 near the RCON transmitter 30 to prevent robot 20 from crossing the beam 42 in its most narrow region closest to the RCON transmitter 30 and, in addition, prevents robot 20 from coming into direct contact with the RCON transmitter 30. In the preferred embodiment, a lens identical to the lens portion of the RCON detector, described below, is used for the secondary emitter 34. In other embodiments, a single active emitter operatively connected to appropriate optics can be used to create multiple emission points, including the two emitter system disclosed herein.

Because of potential interference from sunlight and other IR sources, most IR devices, such as remote controls, personal digital assistances and other IR communication devices, modulate the emitted signal. Herein, the emitters 32 & 34 modulate the beam at 38 kHz. In addition, IR devices modulate the beam to provide a serial bit stream to the unit being controlled to tell it what to do. In an embodiment of the present invention, additional modulation of the beam at a frequency, for example 500 Hz, different from the frequency of common IR bit streams prevents interference with other IR equipment.

While the preferred embodiment uses an infrared signal, the system and method of the present invention can use other signals such as electromagnetic energy to accomplish the goals, including radio waves, X-rays, microwaves, etc. Many of these types of waves have significant drawbacks. For example, radio waves are more difficult and expensive to make directional, and visible light suffers from interference from many sources and may be distracting to users. Sound waves could also be used, but it is similarly difficult to make purely directional and tend to scatter and reflect more.

Robot

Figure 3A:
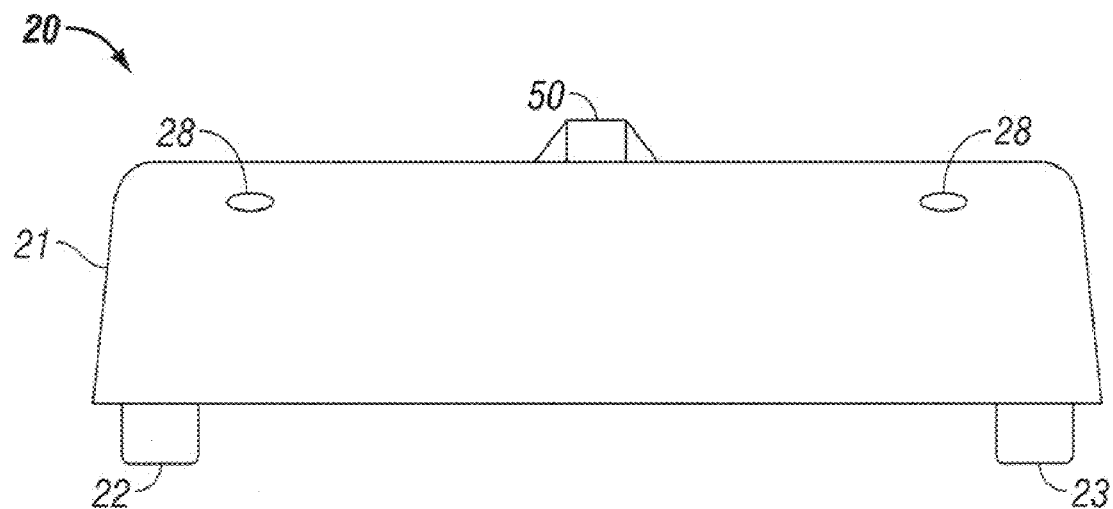
FIG. 3A shows a side-view schematic representation of a mobile robot used in a preferred embodiment of the invention.
Figure 3B:
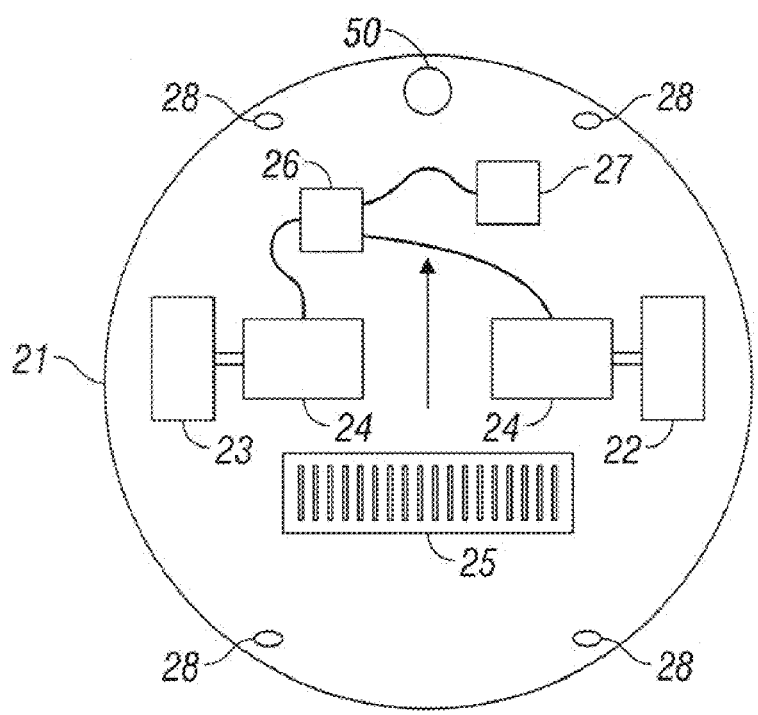
FIG. 3B shows a top-view schematic representation of a mobile robot used in a preferred embodiment of the invention.

As shown in FIGS. 3A & 3B, in the preferred embodiment, the robot 20 comprises a substantially circular shell 21 mounted to a chassis containing two wheels 22 & 23 mounted on opposite sides of a center line, wherein each of the wheels 22 & 23 can be independently driven to allow the robot to turn. In the preferred embodiment, the wheels are mounted in such a manner as to allow the robot to turn substantially in place. The preferred embodiment of the robot 20 also comprises motors 24, cleaning mechanism 25, rechargeable battery 26, microprocessor 27, and various tactile and optical sensors 28.

Figure 5:
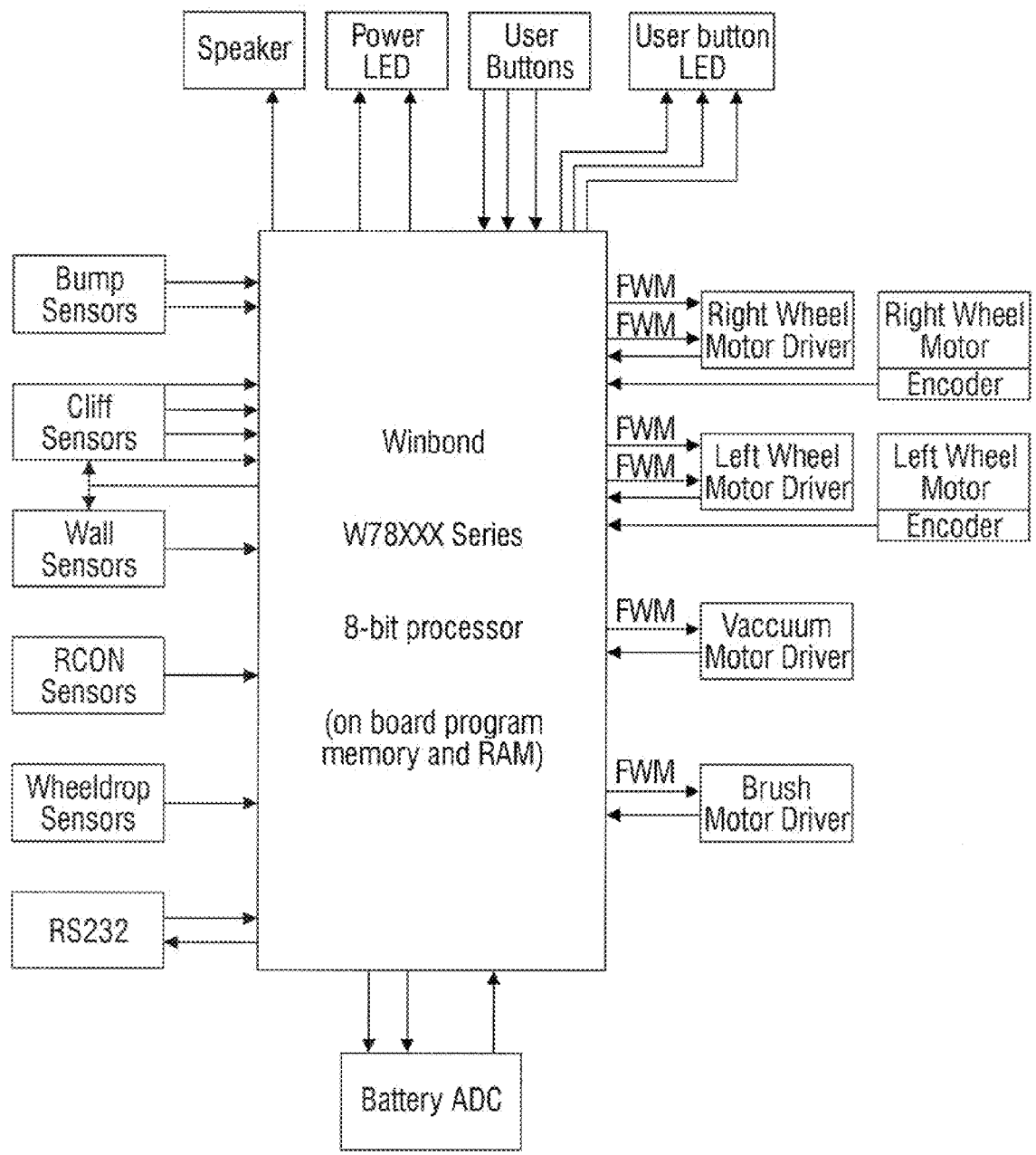
FIG. 5 demonstrates a hardware block diagram of the robot shown in FIGS. 3A & 3B.

In FIG. 5 is illustrated a hardware block diagram of a robot similar to the one shown in FIGS. 3A & 3B. The hardware is built around a Winbond W78 XXX Series 8-bit processor. The processor is controlled by software stored in ROM. The system shown in FIG. 5 includes various control functions and motor drivers, along with various sensors (e.g. physical bump sensors, cliff sensors, the RCON detector/sensor).

For the instant invention, the robot also has an RCON detector 50, which in the preferred embodiment is a standard IR receiver module, which comprises a photodiode and related amplification and detection circuitry, mounted below an omni-directional lens, where omni-directional refers to a single plane. In a preferred embodiment, the IR receiver module is East Dynamic Corporation p/n IRM-8601S. However, any IR receiver module, regardless of modulation or peak detection wavelength, can be used as long as the RCON emitter is also changed to match the receiver. As shown in FIGS. 3A & 3B, the RCON detector is mounted at the highest point on the robot 20 and toward the front of the robot as defined by the primary traveling direction of the robot, as indicated by an arrow in FIG. 3B.

While the RCON detector should be mounted at the highest point of the robot in order to avoid shadows, it is desirable in certain applications to minimize the height of the robot 20 and/or the RCON detector 50 to prevent operational difficulties and to allow the robot 20 to pass under furniture or other obstacles. In certain embodiments, the RCON detector 50 can be spring mounted to allow the detector to collapse into the body of the robot when the robot runs under a solid overhanging object.

Figure 4:
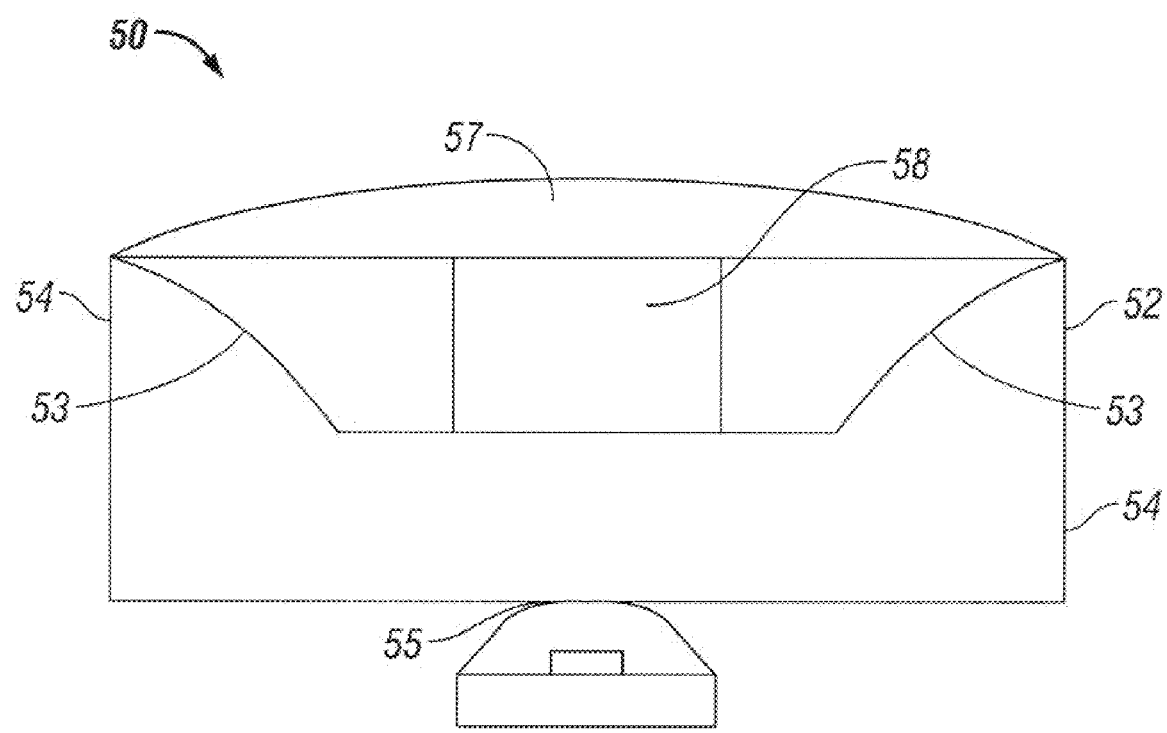
FIG. 4 shows a side-view of a preferred embodiment of an omni-directional barrier signal detector.

FIG. 4 shows in detail the preferred embodiment of the RCON detector 50. The RCON detector 50 includes a lens 52 that allows in the barrier signal (or rays) 42 from all directions through the outer lens wall 54 and focuses the rays at IR detector 55. At the same time, the method and systems of the present invention are likely to be used in the presence of sunlight. Because direct sunlight can easily saturate the IR detector 55, efforts may be made to exclude sunlight from the RCON detector 50. Therefore, in the preferred embodiment, opaque plastic horizontal plate 57 is used, which is supported by post 58.

The lens 52 used in the preferred embodiment is a primarily cylindrical device designed to accept rays perpendicular to the axis of the lens and to reject rays substantially above or substantially below the plane perpendicular to the axis of the lens. The lens focuses horizontal rays primarily on IR detector 55 mounted below the lens.

In the preferred embodiment, the geometry of the lens is determined by rotating a parabola about its focus, where the focus is collocated with the active element of the receiver 55. The inner lens wall 53 is thereby defined by the swept parabola. The rays are reflected by the phenomena called total internal reflection, defined here by the discontinuation between the lens material and the material internal to the inner lens wall 53. The preferred embodiment is constructed of clear polycarbonate chosen for its low cost and index of refraction.

The omni-directional nature of the RCON detector 50 allows a system with only a single RCON detector 50 to function equally well regardless of the angle of incident radiation from the RCON transmitter. If the RCON detector 50 is insensitive to the beams 42 & 44 from certain angles, then the robot 20 can break through the confining beams 42 & 44 when the robot 20 approaches the beam(s) such that the beam(s) occupies the RCON detector 50 blind spot.

In addition, in the preferred embodiment, the RCON transmitter 30 is battery powered. This imposes a high sensitivity requirement on the robot-mounted detector 50 in order to promote long battery life in the emitter 30. As such, the RCON detection system should be designed to gather as much IR as possible from the emitter(s).

The RCON detector of the preferred embodiment is designed to be triggered by modulated IR above a certain intensity threshold. If the IR levels are below the given threshold, the RCON detector computes no detection whatsoever and therefore triggers no specific control commands.

Figure 6:
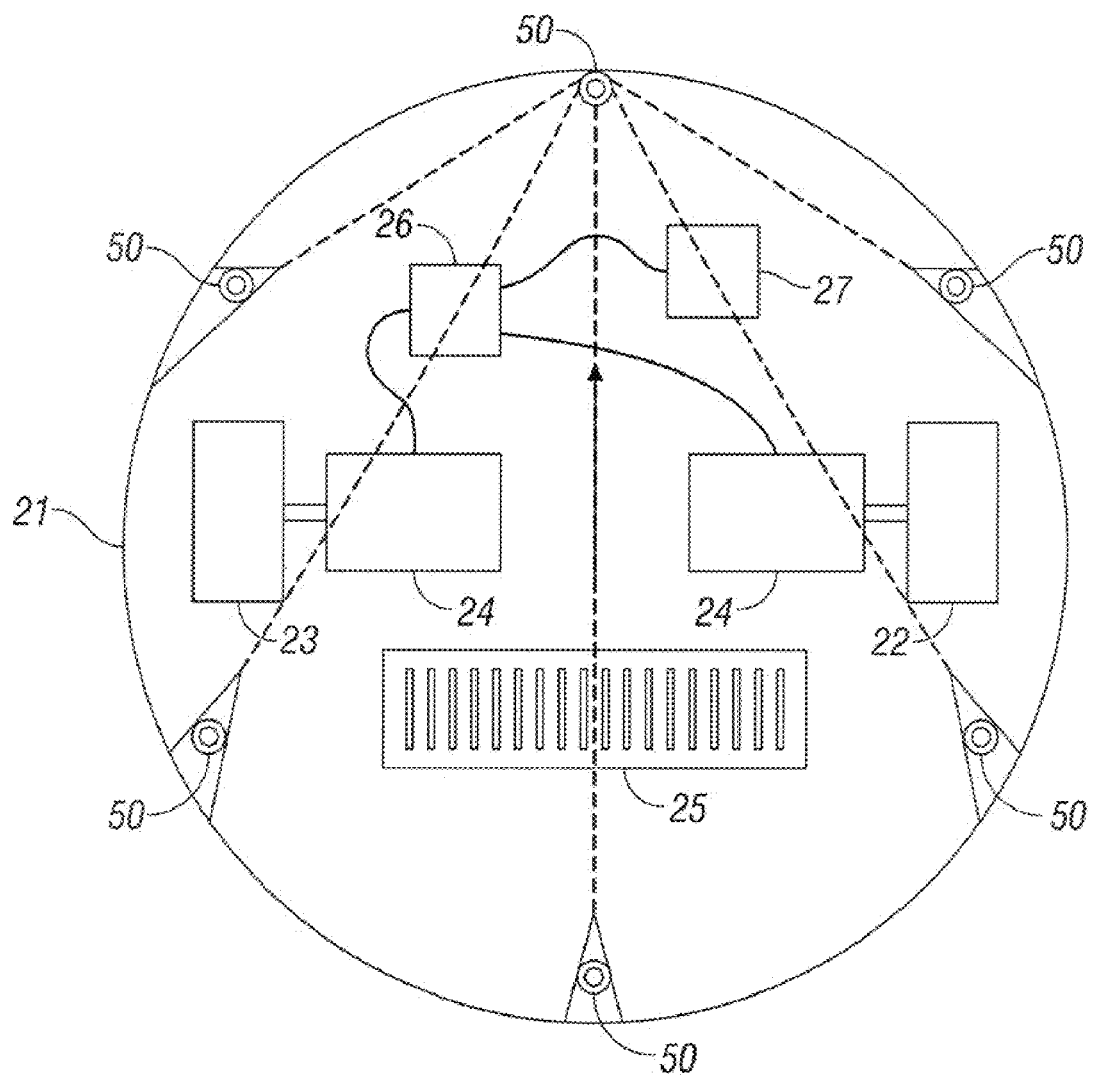
FIG. 6 shows a schematic representation of an alternative embodiment of the robot employing multiple barrier signal detectors.

One of skill in the art will recognize that in alternative embodiments multiple RCON detectors 50 can be used. FIG. 6 illustrates such an embodiment using six side-mounted sensors 50. Each of the sensors should be oriented in a manner to have its field of view correspond to that of the single, top mounted sensor. Because a single, omni-directional RCON detector should be mounted at the highest point of the robot for optimal performance, it is possible to lower the profile of the robot by incorporating multiple detectors.

As disclosed above, the system and method of the present invention can be used with any number of robots existing in the prior art, including those designed for indoor cleaning applications.

Operation of System & Method

Figure 8A:
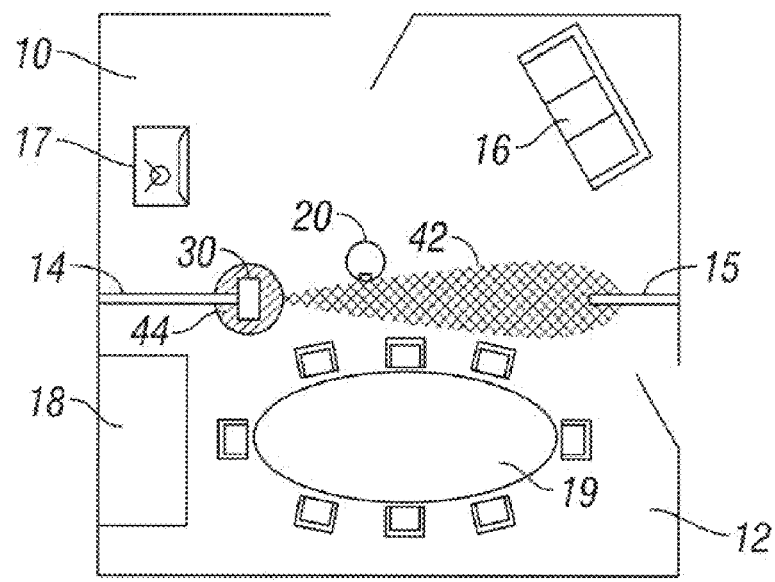
FIGS. 8A-C are schematic illustrations of the system and method of a preferred embodiment of the present invention.
Figure 8B:
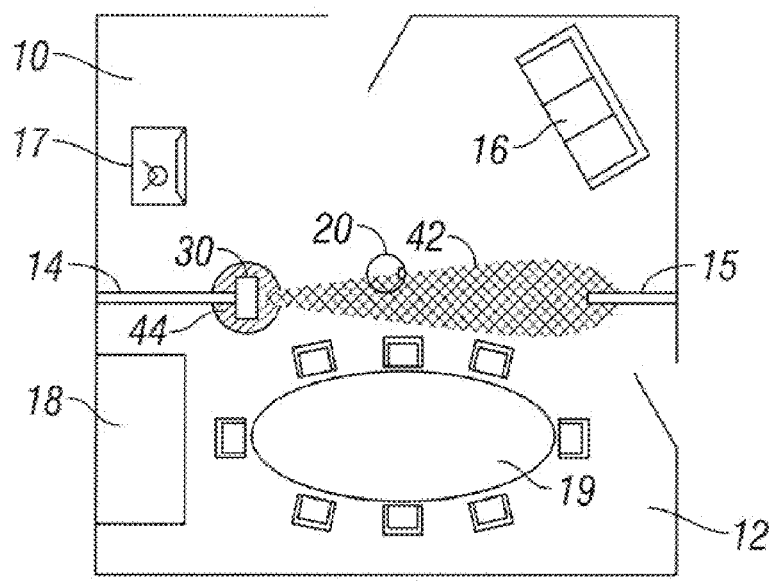
Figure 8C:
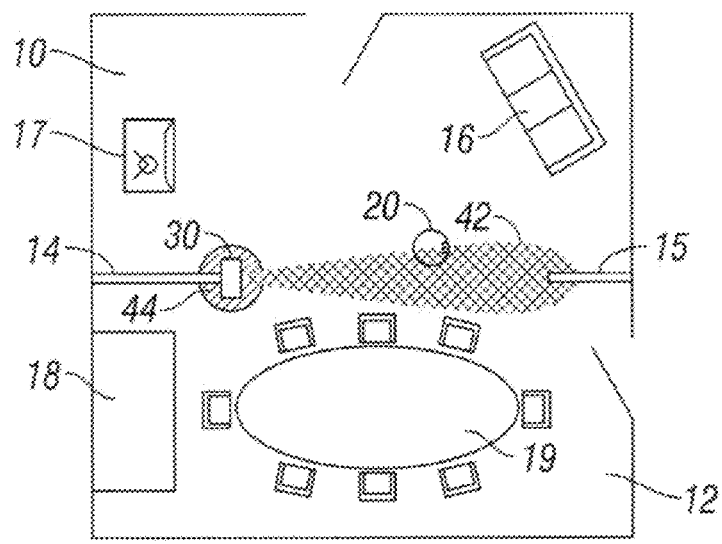

As shown in FIGS. 8A-C, an IR beam is used to divide the space (living room 10 and dining room 12) into two distinct areas. The robot has a sensor for detecting this beam 42 mounted at the robot's top front. As seen in FIG. 8B, whenever a measurable level of IR radiation strikes the detector the robot's IR avoidance behavior is triggered. In a preferred embodiment, this behavior causes the robot to spin in place to the left until the IR signal falls below detectable levels (FIG. 8C). The robot then resumes its previous motion. Spinning left is desired in certain systems because, by convention, the robot attempts to keep all objects to its right during following operations. The robot's confinement behavior is consistent with its other behaviors if it spins left on detecting the confining beam 42. In this embodiment, the IR sensor acts as a gradient detector. When the robot encounters a region of higher IR intensity the robot spins in place. Because the IR sensor is mounted at the front of the robot and because the robot does not move backward, the sensor always sees the increasing IR intensity before other parts of the robot. Thus spinning in place causes the sensor to translate to a region of decreased intensity. When the robot next moves forward, following the sensor, the robot necessarily moves to a region of decreased IR intensity—away from the beam.

In another preferred embodiment, the room confinement behavior works as a single behavior in a strictly priority based behavior system which controls the robot's motion. Each of the behaviors is assigned a priority, and the behavior with the highest priority requests control of the robot at any given time and has full control of the robot. These behaviors may include driving forward, turning when bumped, spiraling, etc. The confinement behavior is one of the highest priority behaviors. It requests control of the robot when the room confinement IR sensor has detected a signal from a room confinement transmitter.

Figures 7A, 7B:
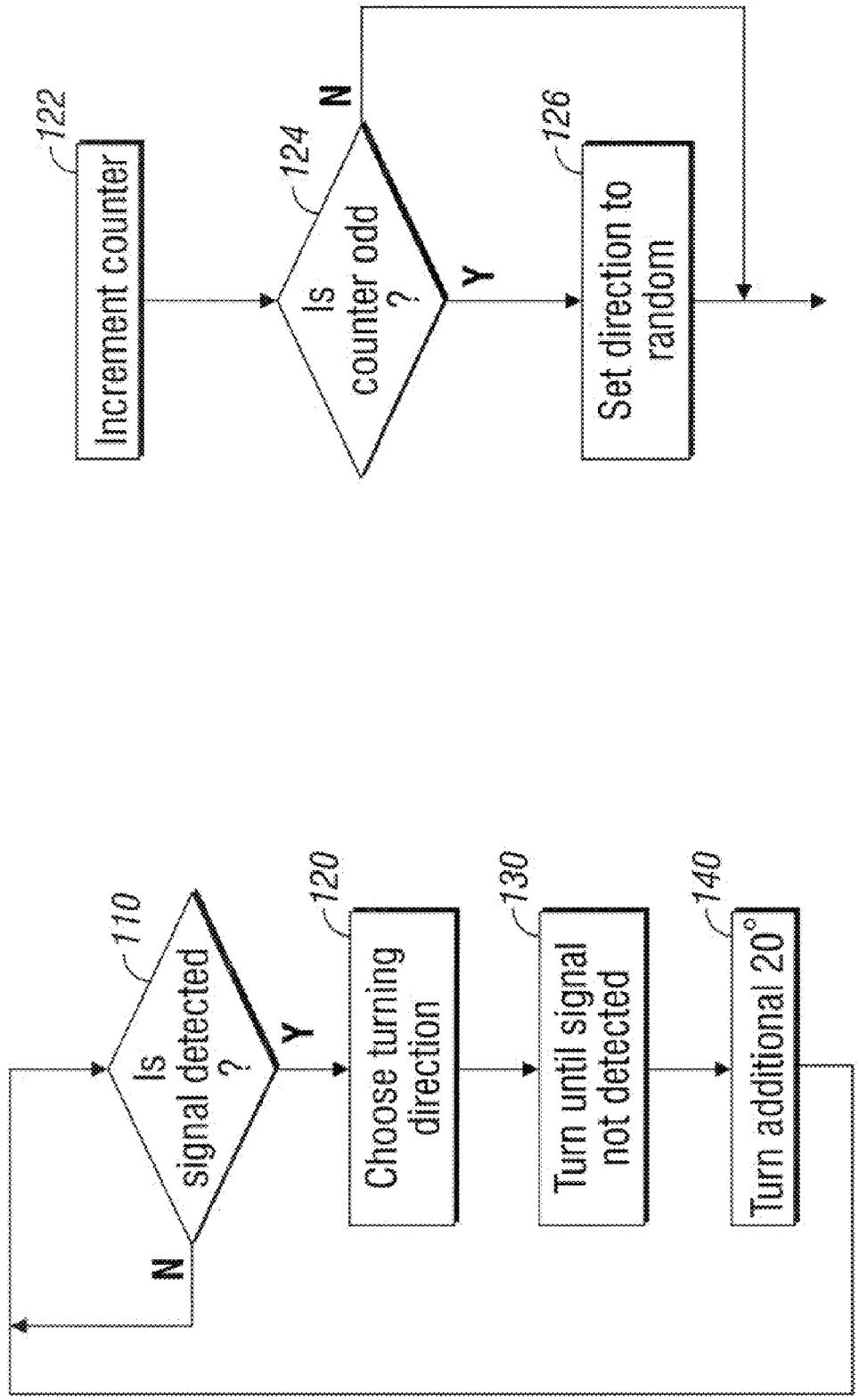
FIGS. 7A & 7B are flow-chart illustrations of the barrier avoidance algorithm of a preferred embodiment of the invention.

A flow-chart of a preferred embodiment of the control logic of the confinement behavior is shown in FIG. 7A. The robot determines whether the RCON detector detects a signal (step 110). If a signal is detected, the robot chooses a turning direction (step 120). The robot then begins to turn in the chosen direction until the signal is no longer detected (step 130). Once the signal is no longer detected, the robot continues turning for an additional distance (step 140).

In the preferred embodiment of step 120, the direction is chosen through the algorithm illustrated in the flow chart shown in FIG. 7B. The robot's control logic keeps track of the robot's discrete interactions with the beam. The robot first increments the counter by one (step 122). On odd numbered interactions, the robot chooses a new turning direction randomly (steps 124 & 126); on even numbered interactions, the robot again uses its most recent turning direction.

In other embodiments, the robot can always turn a single direction or choose a direction randomly. When the robot always turns one direction, the robot may get stuck in a loop by turning away from the beam, bumping into another obstacle in a room, turning back toward the beam, seeing the beam again, turning away, bumping again, ad infinitum. Moreover, when the robot only turns in a single direction, it preferentially ends up at one end of the beam. Where the robot's task is to complete work evenly throughout a room, such as cleaning, a single turning direction is not optimal. If the direction is chosen purely randomly, the robot may turn back and forth quite a bit as it encounters the beam more than once.

In the preferred embodiment of step 140, the robot turns an additional 20 degrees from the point at which the signal is lost. The amount of the turn, which was selected arbitrarily in the preferred embodiment, is left to the particular robot and application. The additional turn prevents the robot from re-encountering the confinement beam immediately after exiting the beam. For various applications, the amount of additional movement (linear or turning) can be a predetermined distance or time, or in the alternative may include a random component.

In still other embodiments, the robot's avoidance behavior may include reversing the robot's direction until the beam 42 is no longer detected.

In other embodiments, the RCON detector is able to determine the gradient levels of the beam. This information can be used to send the robot in the direction of the lowest level of detection and prevent the situation where the robot is situated entirely within the beam and therefore turns in 360 degrees without the detector exiting the beam. In these embodiments, if the robot turns 360 degrees without exiting the beam, the control logic may give a higher priority to a "gradient behavior." The gradient behavior divides the possible robot headings into a fixed number of angular bins, each bin covering an equal sweep of the angular area around the robot. The robot then turns at a constant rate while sampling the number of detections in each angular bin. (For a system using infrared signals, detection counts are monotonically related to the signal strength.) After the robot has rotated more than 360 degrees, the gradient behavior commands the robot to turn toward the angular bin with the lowest detection count. When the robot achieves the correct heading, the gradient behavior commands the robot to move forward a predetermined distance, for example one-half of the width of the robot, then control is released from the gradient behavior. If necessary, this process repeats until the robot has moved into a region where IR intensity is below the detection threshold.

One of skill in the art will recognize that the emitter/detector system can also be used to guide the robot in any number of ways. For example, the beam 42 could be used to allow the robot to perform work parallel to the edge of the beam, allowing, for example, the floor right up to the edge of the room confinement beam to be cleaned.

Figure 9A:
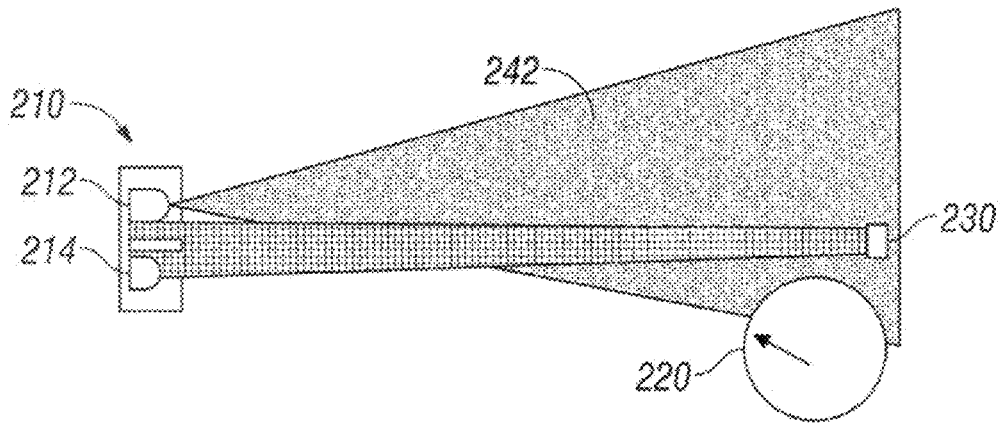
FIGS. 9A-B are schematic illustrations of the system and method of an alternative embodiment of the present invention.

In an alternative embodiment of the present invention, the RCON transmitter may comprise both a signal emitter and a signal detector. As shown in FIG. 9A, the RCON transmitter 210 includes both a primary emitter 212 and a detector 214. The RCON transmitter 210 is placed at one end of the desired barrier and a retroreflector 230 is placed at the opposite end of the desired barrier. The retroreflector, which reflects the beam back toward the emitter regardless of the orientation of the retroreflector relative to the beam, can be constructed from, for example, standard bicycle reflectors. As shown in FIG. 9A, primary emitter 212 produces beam 242. A portion of beam 242 reflects from retroreflector 230 and is detected by detector 214.

Figure 9B:
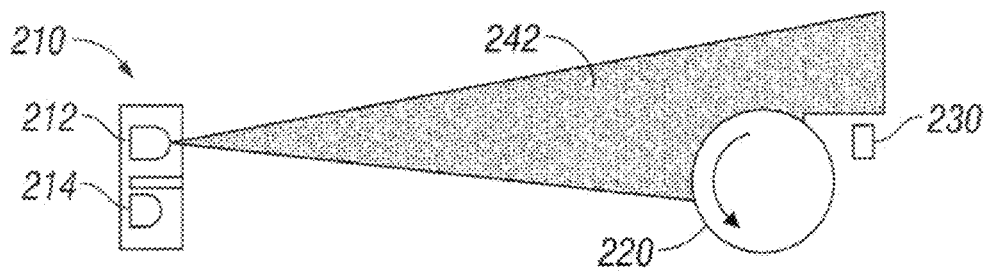

In the embodiment shown in FIGS. 9A & 9B, the IR radiation emitted by the primary emitter 212 can be modulated in either of two ways constituting signal A or signal B. During normal operation, the beam 242 emitted from the primary emitter 212 is reflected by the retro-reflective material 230 back into the detector 214. When this is true the RCON transmitter broadcasts signal A, which is received by robot 220. As shown in FIG. 9B, if the robot or other object comes between the emitter 212 and the retro-reflective material 230 then no signal is returned to the receiver 214 and the RCON transmitter 210 broadcasts signal B, which is received by robot 220. The robot 220 then uses this information to improve its performance. The robot turns away from the beam as described previously only when the robot detects signal B. When the robot detects signal A no action is taken.

For certain applications, the embodiment shown in FIGS. 9A & 9B provides improved performance. For example, in cleaning application, the completeness of cleaning is improved because the robot tends to clean up to the line connecting the confinement device and the retro-reflective material. Also, this embodiment is more resistant to beam blockage. If furniture or other obstacles partially occlude the beam, the robot tends to turn away when it is further from crossing the beam. Finally, an indicator, such as an LED, can be added to the RCON transmitter to indicate when the device is functioning and correctly aimed.

In other embodiments, the RCON transmitter can be used to define an annular confinement region. For example, an RCON transmitter with two omni-directional emitters may be employed, wherein the first emitter would broadcast the standard modulated beam and the second emitter would a emit radiation 180 degrees out of phase with the output of the first emitter, but with less power. The robot would be programmed to turn when the IR was not detected. As the robot gets further from the emitter, it would eventually, lose the beam and turn back into it. As it gets closer, the radiation from the second emitter would jam the radiation from the first emitter, creating essentially unmodulated IR. The detector would fail to detect this, and the robot would again turn back into the annulus.

In yet another embodiment, the RCON transmitter can be used as a "home base." For example, once the voltage of the robot's battery drops below a predetermined level, the robot can use the gradient detection behavior to home in on the RCON transmitter. This allows the user to easily find the robot when it has finished cleaning instead of it randomly ending up in corners, under furniture, etc.

Although the description above contain many specificities, there should not be construed as limiting the scope of the invention but as merely providing illustrations of some of the presently preferred embodiments of this invention.

Other embodiments of the invention are within the scope of the following claims.

What is claimed is:

1. A robot navigation system comprising:
   a robot having a light beam receiver oriented in a manner to have an omnidirectional field of view and configured to receive both directed beams and diffuse light signals; and
   at least one omnidirectional diffuse light region emitter that emits a modulated diffuse light region, wherein the omnidirectional modulated diffuse light region is positioned in a plane parallel to ground level such that a light beam receiver on the robot is in substantially the same plane as the omnidirectional modulated diffuse light region; and
   at least one directional light beam emitter that emits a directed beam defining a navigation barrier.

2. The navigation system of claim 1, wherein the omnidirectional modulated diffuse light region is modulated in an infrared frequency.

3. The navigation system of claim 1, wherein the light beam emitter is responsive to a robot that sends a signal to the light beam emitter to turn the light beam emitter on.

4. The navigation system of claim 1, further comprising a detector on the omnidirectional light region emitter.

5. The navigation system of claim 4, wherein the omnidirectional light region emitter emits a light beam of a second modulation upon interruption of a first modulated diffuse light beam.

6. The navigation system of claim 1, wherein the robot is configured to avoid contact with the omnidirectional diffuse light region emitter.

7. The navigation system of claim 6, wherein the omnidirectional diffuse light region emitter is located on at least one of a charging base station, a virtual wall beacon and a portable barrier signal transmitter.

8. The navigation system of claim 1, wherein the directional light beam emitter is positioned to define a confined work area.

9. The navigation system of claim 1, further comprising:
   a detector on the omnidirectional light region emitter; and
   an electromagnetic signal emitter that emits radio, x-ray or microwave signals to the robot in response to interruption of a directed light beam detected by the detector.

10. The navigation system of claim 1, wherein the light beam receiver is a single omnidirectional-sensor.

11. The navigation system of claim 1, wherein the light beam receiver comprises a plurality of side-mounted sensors.

12. A method of navigating a robot based on differing light signals, the method comprising:
   providing, on a robot, a light beam receiver oriented in a manner to have an omnidirectional field of view and being configured to receive both directed beams and diffuse light signals;
   providing at least one omnidirectional diffuse light region emitter that emits a modulated diffuse light region;
   positioning the omnidirectional modulated diffuse light region emitter in a plane parallel to ground level such that the light beam receiver on the robot is in the same plane as the omnidirectional modulated diffuse light region; and
   defining via at least one directional light beam emitter a directed barrier with a directed beam detectable by the light beam receiver of the robot.

13. The method of claim 12, further comprising controlling a robot drive to reverse the direction of travel of the robot in response to detection of the directed barrier.

14. The method of claim 12, further comprising controlling a robot drive to turn the robot in response to detection of the directed barrier.

15. The method of claim 14, wherein controlling the robot includes turning the robot in one of a random direction and a predetermined direction until the directed barrier is no longer detected.

16. The method of claim 12, further comprising controlling a robot drive such that the robot alternately approaches and avoids the directed barrier.

17. The method of claim 12, wherein the light beam receiver is a single omnidirectional-sensor.

18. The method of claim 12, wherein the light beam receiver comprises a plurality of side-mounted sensors.

* * * * *